US011353357B2

(12) United States Patent
Tsutsumi et al.

(10) Patent No.: US 11,353,357 B2
(45) Date of Patent: Jun. 7, 2022

(54) POINT OF SALE SCALE WITH A CONTROL UNIT THAT SETS THE PRICE CALCULATED WHEN THE PRODUCT IS REMOVED FROM THE SCALE

(71) Applicant: Ishida Co., Ltd., Kyoto (JP)

(72) Inventors: Hironori Tsutsumi, Ritto (JP); Kengo Aoyama, Ritto (JP); Takayuki Morita, Ritto (JP); Futoshi Yurugi, Ritto (JP); Mizuki Iwabuchi, Ritto (JP); Yasunari Nonohara, Ritto (JP); Kosuke Fuchuya, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 64 days.

(21) Appl. No.: 16/776,889

(22) Filed: Jan. 30, 2020

(65) Prior Publication Data

US 2020/0256720 A1 Aug. 13, 2020

(30) Foreign Application Priority Data

Feb. 12, 2019 (JP) .............................. JP2019-022952
Sep. 20, 2019 (JP) .............................. JP2019-171002

(51) Int. Cl.
*G01G 19/414* (2006.01)
*G01G 19/415* (2006.01)
*G01G 23/16* (2006.01)
*G01G 23/42* (2006.01)
*G01G 23/46* (2006.01)

(52) U.S. Cl.
CPC ....... *G01G 19/4144* (2013.01); *G01G 19/415* (2013.01); *G01G 23/16* (2013.01); *G01G 23/42* (2013.01); *G01G 23/46* (2013.01)

(58) Field of Classification Search
CPC .. G01G 19/4144; G01G 19/415; G01G 23/16; G01G 23/42; G01G 23/46
See application file for complete search history.

(56) References Cited

U.S. PATENT DOCUMENTS 4,029,161 A * 6/1977 Foster ................ G01G 19/4144
177/25.15
4,055,753 A * 10/1977 Rogers ............... G01G 19/4144
705/415

(Continued)

FOREIGN PATENT DOCUMENTS

CN 102778277 A 11/2012
CN 205664922 U 10/2016

(Continued)

OTHER PUBLICATIONS

The extended European search report issued by the European Patent Office dated Jun. 17, 2020, which corresponds to European Patent Application No. 20154415.2-1001 and is related to U.S. Appl. No. 16/776,889.

*Primary Examiner* — Randy W Gibson
(74) *Attorney, Agent, or Firm* — Studebaker & Brackett PC

(57) ABSTRACT

A weighing machine includes a weighing unit that measures the weight of a product placed on a weighing table, a calculation unit that calculates the price of the product based on the weight of the product measured by the weighing unit, and a control unit that sets the price calculated by the calculation unit when the product is removed from the weighing table.

14 Claims, 18 Drawing Sheets

(56) References Cited

U.S. PATENT DOCUMENTS

| | | | | |
|---|---|---|---|---|
| 4,661,908 A | * | 4/1987 | Hamano | G01G 19/4144 235/383 |
| 4,700,791 A | * | 10/1987 | Iwasaki | G01G 19/415 177/2 |
| 4,716,281 A | * | 12/1987 | Amacher | G01G 19/4144 235/383 |
| 5,839,104 A | * | 11/1998 | Miller | A47F 9/046 704/251 |
| 7,375,294 B2 | * | 5/2008 | Kraft | G01G 19/4144 177/25.15 |
| 8,796,564 B2 | * | 8/2014 | Ting | G07G 1/0072 177/25.13 |
| 9,810,572 B2 | * | 11/2017 | Dyer | G06F 3/04817 |
| 2003/0201319 A1 | | 10/2003 | Patel et al. | |
| 2013/0126248 A1 | * | 5/2013 | Yamaguchi | G07G 1/0072 177/3 |

FOREIGN PATENT DOCUMENTS

| | | |
|---|---|---|
| CN | 205748589 U | 11/2016 |
| CN | 107767590 A | 3/2018 |
| CN | 108593076 A | 9/2018 |
| CN | 108663105 A | 10/2018 |
| CN | 108922084 A | 11/2018 |
| CN | 109255608 A | 1/2019 |
| CN | 208350191 U | 1/2019 |
| EP | 2594911 A2 | 5/2013 |
| EP | 2975568 A1 | 1/2016 |
| JP | 2013-108817 A | 6/2013 |

* cited by examiner

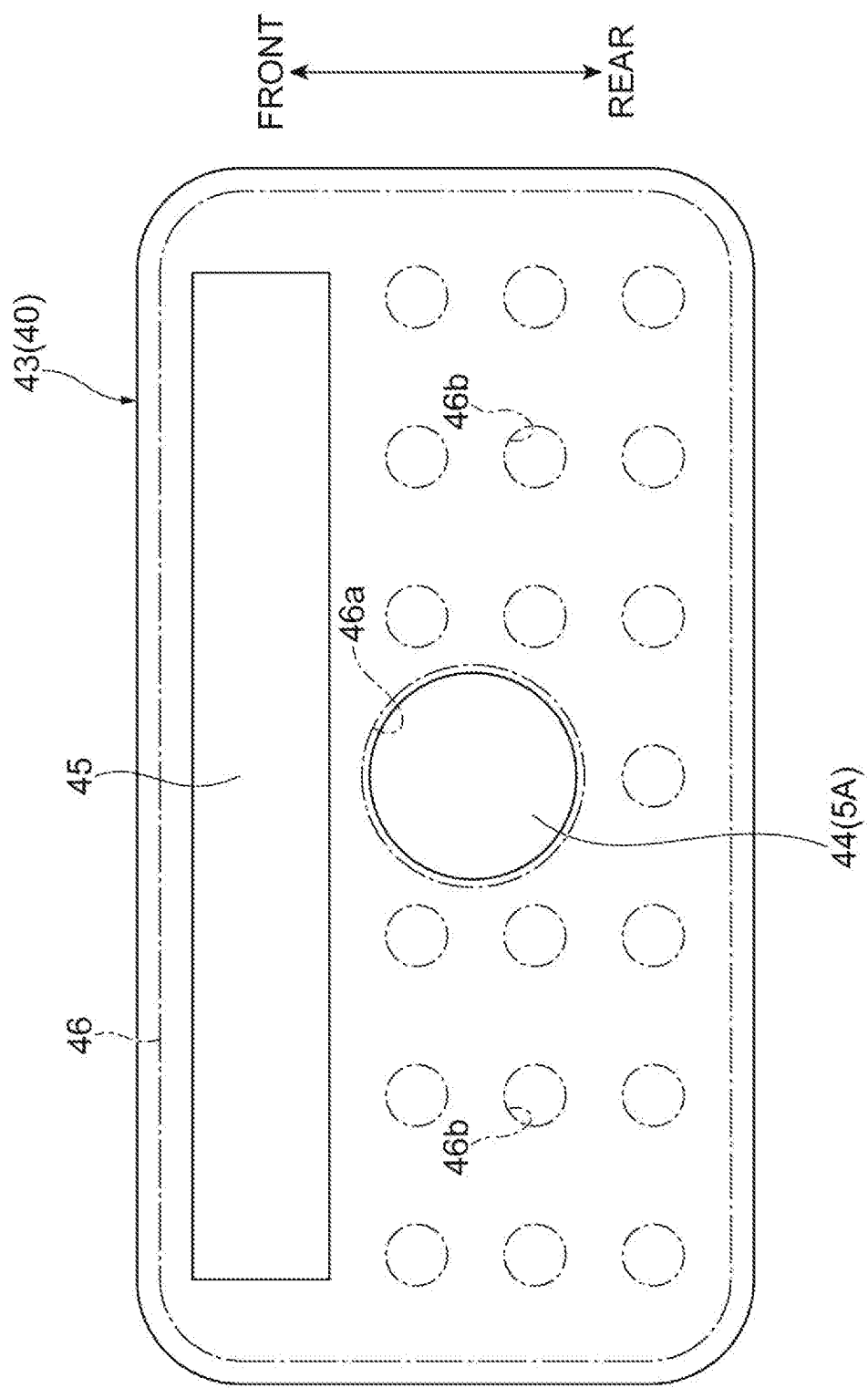

POINT OF SALE SCALE WITH A CONTROL UNIT THAT SETS THE PRICE CALCULATED WHEN THE PRODUCT IS REMOVED FROM THE SCALE

TECHNICAL FIELD

The present invention relates to a weighing machine.

BACKGROUND

In supermarkets and the like, products such as food are weighed and sold. In the measurement sale, a desired amount of product is placed on a weighing device to measure the weight of the product, and the price is calculated based on the measurement value and the unit price (refer to, for example, Japanese Unexamined Patent Publication No. 2013-108817).

SUMMARY

In the weighing device, when the operator sets the price after weighing the product, for example, a label on which the price is written is issued. Such a weighing device is required to further improve operability.

An aspect of the present invention is to provide a weighing device with improved operability.

A weighing device according to an aspect of the invention includes: a weighing unit that measures a weight of a product placed on a placement unit; a calculation unit that calculates a price of the product based on the weight of the product measured by the weighing unit; and a control unit that sets the price calculated by the calculation unit when the product is removed from the placement unit.

In the weighing device according to the aspect of the invention, when the product is removed from the placement unit, the price calculated by the calculation unit is set. Therefore, in the weighing device, the price is automatically set even if an operation for setting the price of the product is not performed. As a result, since a weighing machine does not require an operation for setting the price, it is possible to improve operability.

In an embodiment, an issuing unit that issues a label on which the price calculated by the calculation unit is printed may be further provided. When the product is removed from the placement unit, the control unit may set the price and cause the issuing unit to issue the label on which the price is printed. With this configuration, the issuing unit can issue a label without performing an operation for issuing the label. Therefore, since the weighing machine does not require an operation for issuing a label, it is possible to improve operability.

In an embodiment, an output unit that outputs the price calculated by the calculation unit may be further provided. When the product is removed from the placement unit, the control unit may set the price and cause the output unit to output the price. In this configuration, for example, by outputting the price to a predetermined server apparatus managed by a store having a weighing machine, payment with a credit card or the like registered in advance by the customer becomes possible. As a result, payment at the store can be omitted. In addition, the output unit outputs the price to the payment machine installed in the store, so that payment at the payment machine can be made without going through a cash register.

In an embodiment, the control unit may determine whether or not the product has been removed from the placement unit based on a change in a measurement value of the product in the weighing unit. In this configuration, it is possible to accurately and quickly determine that the product has been removed from the placement unit.

In an embodiment, the control unit may determine that the product has been removed from the placement unit when at least one of a case where a change of a threshold value or more occurs from a stable measurement value when measurement of the product is stabilized in the weighing unit, a case where the measurement value changes from the stable measurement value to zero, and a case where the measurement value is reduced from the stable measurement value is satisfied. In this configuration, it is not determined that the product has been removed with a slight change in the measurement value due to vibration or the like. Therefore, the weighing machine can more reliably determine that the product has been removed from the placement unit.

In an embodiment, the control unit may determine that the product has been removed from the placement unit when the measurement value becomes lower than the stable measurement value by the threshold value or more. In this configuration, when the product is lifted from the placement unit, it is determined that the product has been removed from the placement unit. Therefore, in the weighing machine, it is possible to increase the amount of the product in a state in which the product is placed on the placement unit.

In an embodiment, an imaging unit that images the product placed on the placement unit may be further provided, and the control unit determines whether or not the product has been removed from the placement unit based on an image captured by the imaging unit. In this configuration, it is possible to appropriately determine that the product has been removed from the placement unit.

In an embodiment, an imaging unit that images the product placed on the placement unit and an estimation unit that estimates a type of the product based on an image captured by the imaging unit may be further provided, and the calculation unit may calculate a price of the product estimated by the estimation unit. In this configuration, even if the operator does not perform an operation of designating (selecting) the product, the product is estimated and the price is calculated. Therefore, since the weighing machine does not require an operation for designating the product, operability can be further improved.

In an embodiment, the estimation unit may determine whether or not a position of the product has been determined on the placement unit based on a plurality of images captured by the imaging unit. When it is determined that the position of the product has been determined, the estimation unit may estimate the type of the product based on one of the images determined that the position has been determined. In this configuration, since the type of the product is estimated based on the image when the position of the product is determined, that is, the image of the product stably placed on the placement unit, the type of the product can be estimated with high accuracy.

In an embodiment, a display unit that displays the images captured by the imaging unit may be further provided, and the display unit may display the one image. In this configuration, an image used for estimating the product is displayed on the display unit. Therefore, for example, it is possible to check a problem, such as an operator's hand appearing in the image.

In an embodiment, an operation unit that receives an input for instructing the estimation unit to estimate the product again after the one image is displayed on the display unit may be further provided. When the operation unit receives the instruction input, the estimation unit may estimate the type of the product based on an image newly captured by the imaging unit. If the position of the product is shifted or the operator's hand appears in the image displayed on the display unit, the type of the product may not be estimated correctly. In the weighing machine, when the operation unit receives an instruction input, the estimation unit estimates the type of the product based on an image newly captured by the imaging unit. As a result, in the weighing machine, it is possible to accurately estimate the type of the product.

In an embodiment, the estimation unit may estimate a plurality of candidates for the product, the display unit may display the plurality of candidates for the product, the operation unit may receive an input for designating the one product among the plurality of candidates for the product, and the calculation unit may calculate a price of the product designated by the operation unit. In this configuration, the operator can select the type of the product. Therefore, in the weighing machine, it is possible to reliably avoid that the price of a product different from the actual product is calculated.

In an embodiment, the estimation unit may set ranks of the plurality of candidates for the product in descending order of a probability that each of the plurality of candidates for the product is the product placed on the placement unit, and the display unit may display the plurality of candidates for the product based on the ranks set by the estimation unit. In this configuration, since the product candidates are displayed in descending order of the probability on the display unit, the operator can easily designate the product.

In an embodiment, a lighting unit that emits light to the placement unit may be further provided. The imaging unit may be disposed above the placement unit, and the lighting unit may be located above the placement unit and disposed such that an optical axis of the light is inclined with respect to the placement unit. In this configuration, for example, when light emitted to the product, it is possible to suppress light reflected by the product from appearing in the image captured by the imaging unit.

In an embodiment, two lighting units may be provided. The two lighting units may be located so as to interpose the imaging unit therebetween above the placement unit and disposed such that optical axes of the light beams are inclined with respect to the placement unit and the optical axes cross each other. In this configuration, in a configuration including two lighting units, it is possible to suppress light reflected by the product from appearing in the image captured by the imaging unit.

In an embodiment, a lighting unit that emits light to the placement unit and a support body in which the imaging unit, the lighting unit, and the weighing unit are disposed may be further provided. The imaging unit may be located above the placement unit in the support body and disposed such that an axis of the imaging unit in an imaging direction is inclined with respect to the placement unit. The lighting unit may be located above the placement unit in the support body and disposed such that an optical axis of the light is inclined with respect to the placement unit. In this configuration, since the imaging unit, the lighting unit, and the weighing unit are integrally provided in the support body, it is possible to improve the mobility of the weighing unit. Therefore, it is possible to increase the degree of freedom of the layout in a store. In addition, the imaging unit is disposed such that the axis of the imaging unit in the imaging direction is inclined with respect to the placement unit, and the lighting unit is disposed such that the optical axis is inclined with respect to the placement unit. In this configuration, when light is emitted to the product, it is possible to suppress light reflected by the product from appearing in the image captured by the imaging unit.

In an embodiment, the imaging unit and the lighting unit may be disposed on a side of one area of two areas of a placement surface of the placement unit, which are defined by a first straight line passing through a center of the placement surface, as viewed from a direction perpendicular to the placement surface and be disposed on a second straight line perpendicular to the first straight line. In this configuration, it is possible to further suppress the light reflected by the product from appearing in the image captured by the imaging unit.

According to one aspect of the invention, it is possible to improve operability.

BRIEF DESCRIPTION OF THE DRAWINGS

FIG. 18 is a diagram illustrating an arrangement of a camera and a lighting unit in a holding unit.

DETAILED DESCRIPTION

Figure 1:
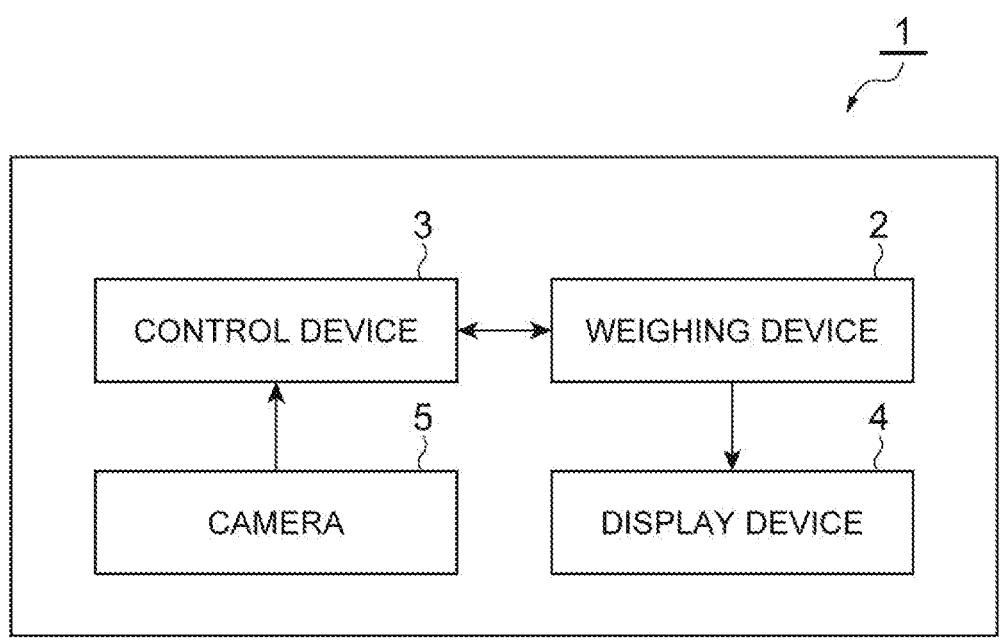
FIG. 1 is a diagram illustrating the configuration of a weighing machine according to an embodiment.

Hereinafter, preferred embodiments of the invention will be described in detail with reference to the accompanying diagrams. In the description of the diagrams, the same or equivalent elements are denoted by the same reference numerals, and repeated description thereof will be omitted.

As illustrated in FIG. 1, a weighing machine 1 includes a weighing device 2, a control device 3, a display device 4, and a camera (imaging unit) 5. The weighing device 2 and the control device 3 are communicably connected to each other. The control device 3 and the camera 5 are communicably connected to each other. The weighing device 2 and the display device 4 are communicably connected to each other.

The weighing device 2 is an electronic scale. The weighing device 2 has a function of weighing a product S (refer to FIG. 3) and issuing a label LC to be attached to the weighed product S. In the present embodiment, the product S is obtained by placing an article G, such as food, in a package P. Here, the package P has a transparent lid. The lid is colored or colorless and is formed of a material that transmits light. The camera 5 images the article G in the package P by imaging the light transmitted through the lid of the package P.

Figure 2:
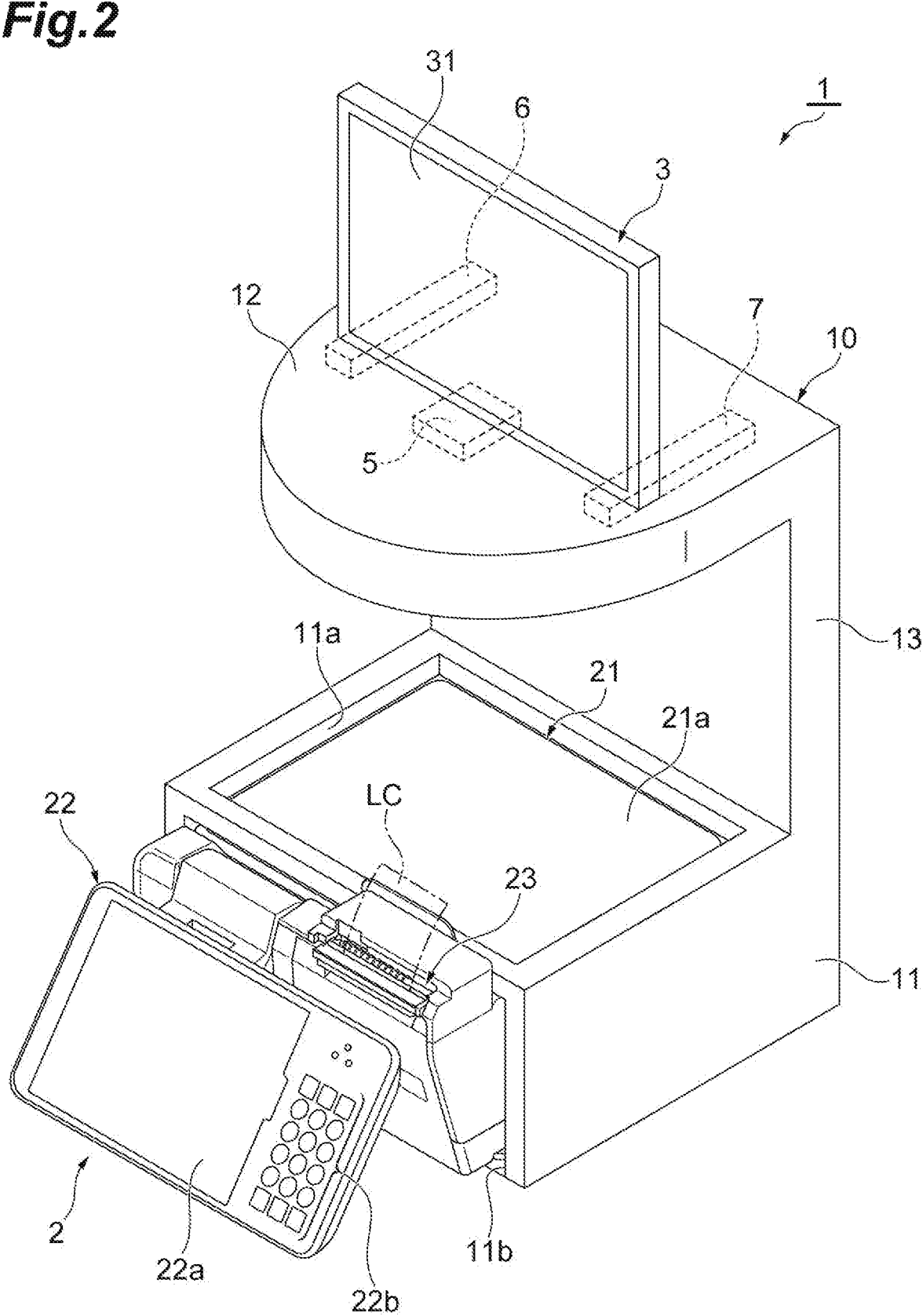
FIG. 2 is a perspective view illustrating the weighing machine.

As illustrated in FIG. 2, in the present embodiment, the weighing device 2 is housed in a housing 10. The housing 10 includes a housing unit 11, a holding unit 12, and a connection unit 13. The housing unit 11 houses the weighing device 2 thereinside. The housing unit 11 has a box shape. The housing unit 11 includes a first opening portion 11*a* for exposing a weighing table 21*a* of a weighing unit 21 of the weighing device 2 and a second opening portion 11*b* for exposing an operation unit 22 of the weighing device 2.

In the holding unit 12, the control device 3, the camera 5, a first lighting unit 6, and a second lighting unit 7 are disposed. The holding unit 12 is disposed on the housing unit 11. The control device 3 is disposed on the holding unit 12. The connection unit 13 connects the housing unit 11 and the holding unit 12 to each other. The connection unit 13 extends along the vertical direction. The display device 4 is disposed on the back surface of the connection unit 13. The display device 4 is, for example, a liquid crystal display. The display device 4 performs display for customers.

The camera 5 is disposed at a position facing the weighing table 21*a* above the weighing table 21*a* (described later) of the weighing device 2. The camera 5 outputs the captured image data to the control device 3.

Figure 3:
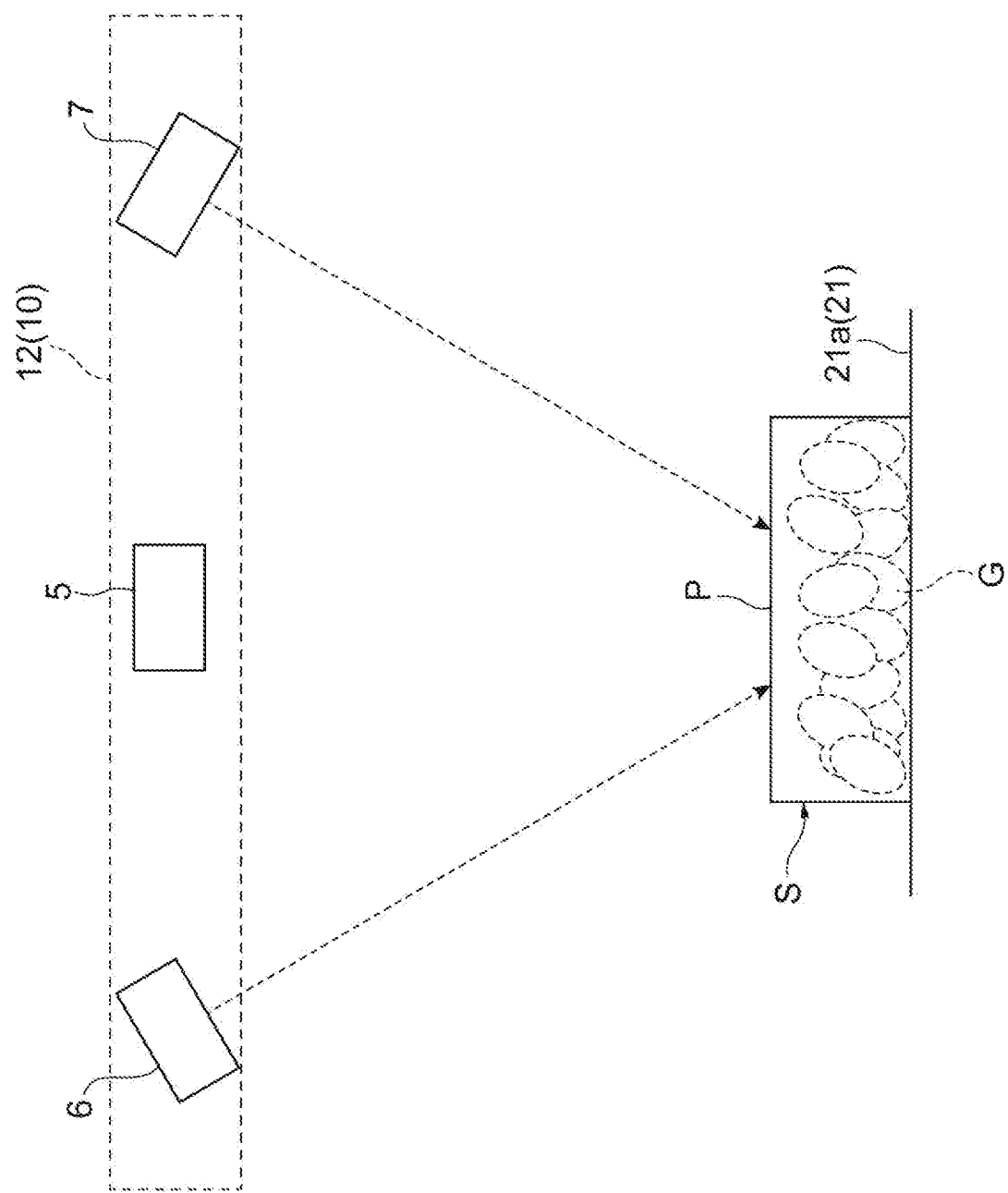
FIG. 3 is a diagram illustrating a camera, a first lighting unit, and a second lighting unit disposed in a housing.

The first lighting unit 6 and the second lighting unit 7 are, for example, LED lighting. As illustrated in FIG. 3, the first lighting unit 6 and the second lighting unit 7 are disposed at positions facing the weighing table 21*a* above the weighing table 21*a* of the weighing device 2. The first lighting unit 6 and the second lighting unit 7 are disposed such that the optical axis of incident light is inclined with respect to the weighing table 21*a*. In addition, the first lighting unit 6 and the second lighting unit 7 are disposed such that the optical axes of incident light beams cross each other. The first lighting unit 6 and the second lighting unit 7 are disposed at predetermined intervals in the width direction of the housing 10. Specifically, the first lighting unit 6 and the second lighting unit 7 are disposed at positions between which the camera 5 is interposed in the width direction of the housing 10.

Figure 4:
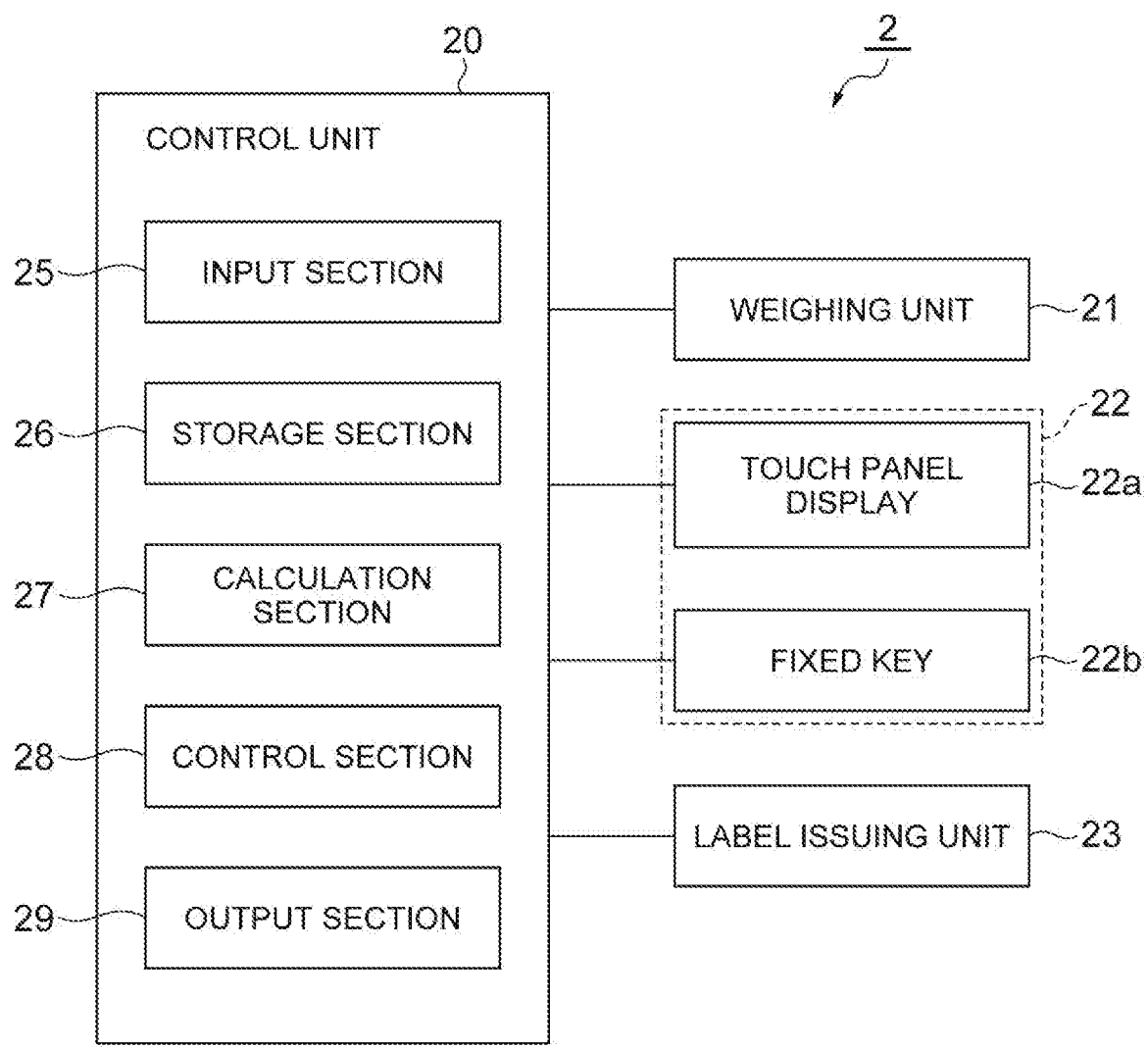
FIG. 4 is a diagram illustrating the configuration of a weighing device.

As illustrated in FIG. 4, the weighing device 2 includes a control unit 20, the weighing unit 21, the operation unit 22, and a label issuing unit 23.

The control unit 20 is a unit that controls various operations in the weighing device 2, and includes a central processing unit (CPU), a read only memory (ROM), a random access memory (RAM), and the like. The control unit 20 controls the display of a touch panel display 22*a* described later.

The weighing unit 21 is configured to include the weighing table (placement unit) 21*a*, a load cell (not illustrated), a signal processing circuit, and a transmission module. The product S is placed on the weighing table 21*a*. The load cell is provided below the weighing table 21*a*. The load cell converts mechanical strain, which is generated when an object to be weighed is placed on the weighing table 21*a*, into an electrical signal. The signal processing circuit amplifies the electrical signal output from the load cell and converts the amplified signal into a digital signal. The transmission module outputs the digital signal to the control unit 20.

The operation unit 22 includes the touch panel display 22*a* and a fixed key 22*b*. On the touch panel display 22*a*, information regarding the product S to be weighed by the weighing device 2, basic information necessary for the operation of the weighing device 2, and the like are displayed under the control of the control unit 20. The fixed key 22*b* includes a "unit price" key, a "fixed amount" key, a "tare" key, a "print" key, a "call" key, and the like necessary as a price scale, and these are appropriately disposed together with numeric keys.

The label issuing unit 23 issues the label LC. The label issuing unit 23 issues the label LC by printing product information based on printing information output from an output section 29 described later. In the present embodiment, the label issuing unit 23 issues a so-called linerless label.

The control unit 20 includes an input section 25, a storage section 26, a calculation section 27, a control section 28, and the output section 29.

The input section 25 inputs number information output from the control device 3. The input section 25 outputs the input number information to the calculation section 27.

The storage section 26 stores a product master. In the product master, product related information that is relevant to the product S is stored for each product S. The product master is a table in which a product number is associated with a product name, a unit price, a fixed amount, and the like. The product master can be updated (changed).

The calculation section 27 calculates the price of the product S. When the number information output from the input section 25 is received, the calculation section 27 refers to the product master based on the product number included in the number information. The calculation section 27 acquires the unit price of the product S corresponding to the product number from the product master. The calculation section 27 calculates the price of the product S based on the measurement value output from the weighing unit 21 and the unit price of the product. When setting information is received from the control section 28, the calculation section 27 sets the price and outputs the print information to the label issuing unit 23. The print information includes at least information indicating the product name, weight, and price. In addition, the calculation section 27 outputs display information for displaying the calculated price on the touch panel display 22*a* to the touch panel display 22*a*.

When the product S is removed from the weighing table 21*a*, the control section 28 sets the price calculated by the calculation section 27. The control section 28 determines whether or not the product S has been removed from the weighing table 21*a*. The control section 28 determines whether or not the product S has been removed from the weighing table 21*a* based on the measurement value of the product S in the weighing unit 21. Specifically, after the measurement value output from the weighing unit 21 is stabilized, when the measurement value changes from the stable measurement value when the measurement is stabilized (not 0 (zero)) to "0 (zero)", the control section 28 determines that the product S has been removed from the weighing table 21*a*. The control section 28 may determine that the product S has been removed from the weighing table 21*a* when the measurement value is "0" for a moment, or may determine that the product S has been removed from the weighing table 21a when the measurement value is "0" for a predetermined time. When it is determined that the product S has been removed from the weighing table 21a, the control section 28 outputs the setting information to the output section 29. The setting information is information instructing the calculation section 27 to set the price. The output section 29 outputs the setting information to the calculation section 27.

Figure 5:
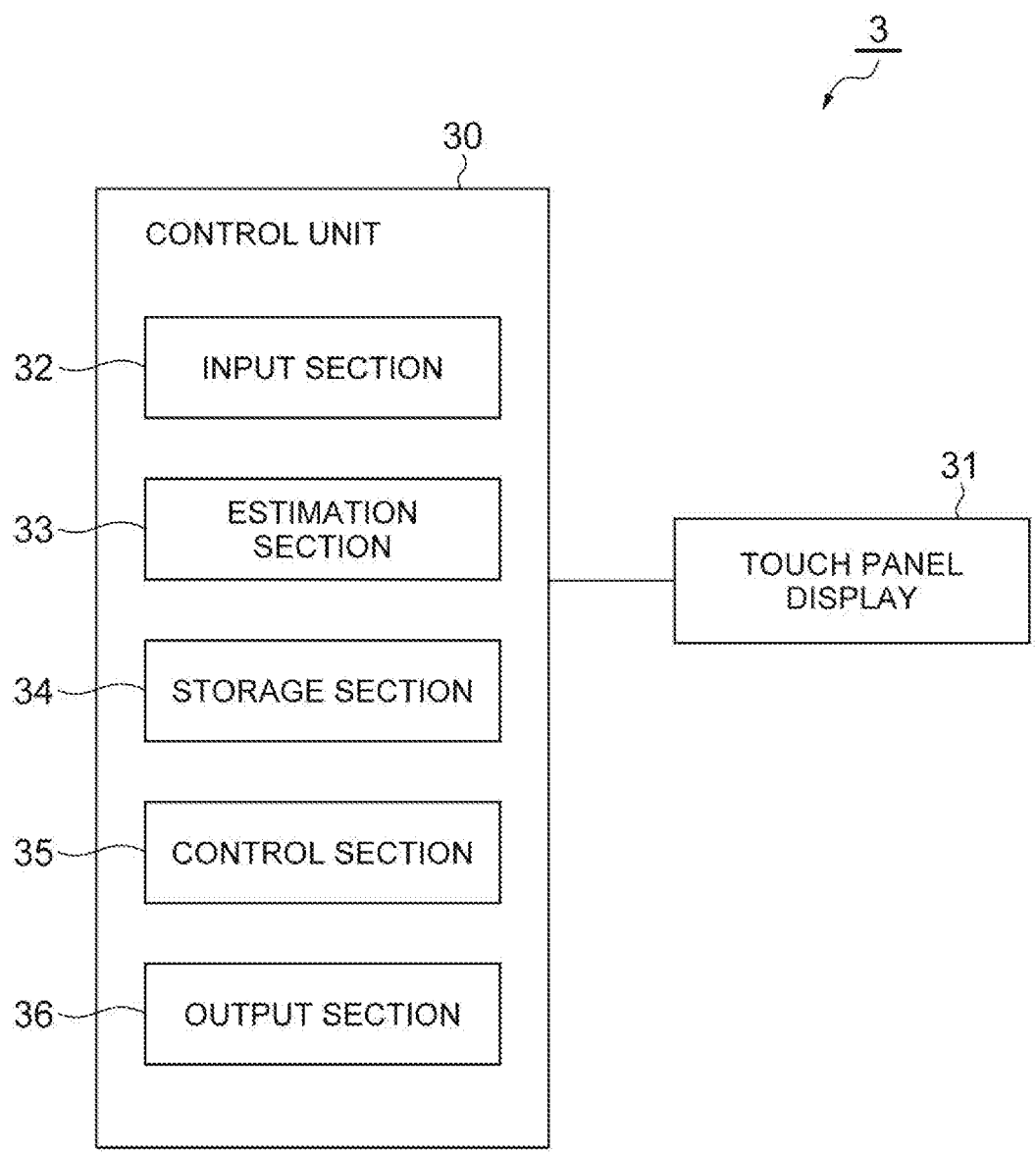
FIG. 5 is a diagram illustrating the configuration of a control device.

As illustrated in FIG. 5, the control device 3 includes a control unit 30 and a touch panel display 31. The control unit 30 controls the display of the touch panel display 31. The control device 3 may be a tablet terminal in which the control unit 30 and the touch panel display 31 are integrated, or may be a computer.

The control unit 30 is a unit that controls various operations in the control device 3, and includes a central processing unit (CPU), a read only memory (ROM), a random access memory (RAM), and the like. The control unit 30 includes an input section 32, an estimation section 33, a control section 34, a storage section 35, and an output section 36.

The input section 32 receives image data output from the camera 5. The input section 32 outputs the input image data to the estimation section 33. In this case, the data output to the estimation section 33 may be obtained by cutting out only an area corresponding to the product S (the product S or the product S and its surroundings) from the image data output from the camera 5. In addition, the input section 32 receives a learned model transmitted from a server apparatus (not illustrated) and stores the learned model in the storage section 35. The learned model is a model generated by machine learning.

The estimation section 33 estimates the type of the product S (article G) placed on the weighing device 2 based on the image data (article G in the image data) captured by the camera 5. Based on the image data output from the input section 32, the estimation section 33 detects that the product S has been placed on the weighing table 21a of the weighing device 2. Specifically, the estimation section 33 detects that the product S has been placed based on the difference (background difference) between the image data output from the input section 32 and a base image (background image) stored in advance. More specifically, the estimation section 33 determines that the product S has been placed when the degree of change from the base image in the image data is equal to or greater than a threshold value.

When it is determined that the product S has been placed, the estimation section 33 determines whether or not the placement of the product S is stable. That is, the estimation section 33 determines whether or not the position of the product S has been determined. The estimation section 33 determines whether or not the placement of the product S is stable using, for example, an inter-frame difference method of consecutive pieces of image data. Specifically, the estimation section 33 determines that the placement of the product S is stable when the difference between frames (for example, the number of pixels each having a change in the pixel value exceeding a predetermined value) in consecutive pieces of image data is equal to or less than a threshold value. When it is determined that the placement of the product S is stable, the estimation section 33 estimates the product S based on an image (one image) in the image data determined to be stable.

In the present embodiment, the estimation section 33 estimates the product S using a learned model. The learned model predicts a product indicated by the image based on the image data by clustering and outputs the product. The learned model includes a neural network NW used for clustering. The learned model may include a convolutional neural network. In addition, the learned model may include a neural network of a plurality of layers (for example, eight layers or more). That is, the learned model may be generated by deep learning.

Figure 6:
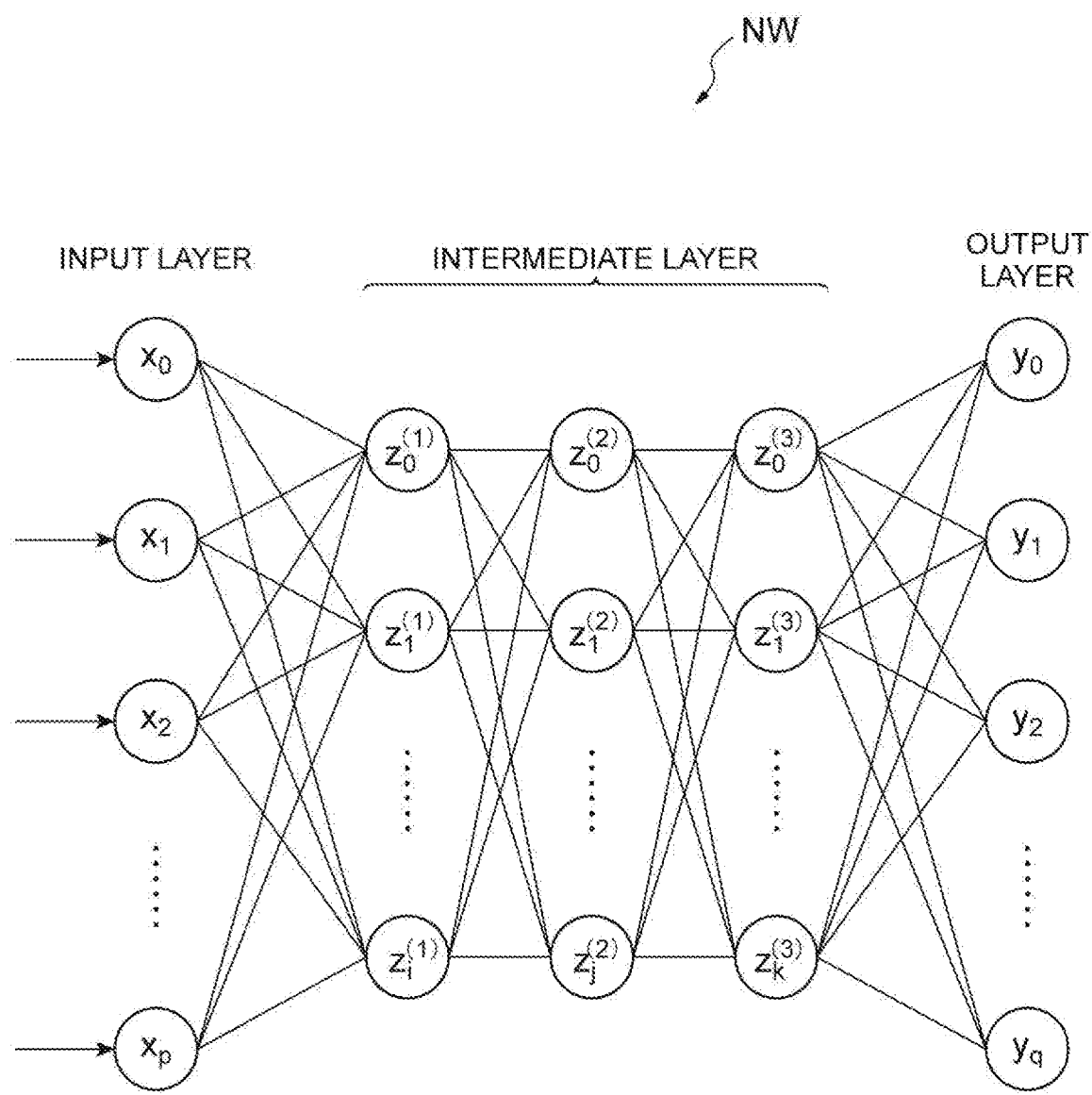
FIG. 6 is a diagram illustrating a neural network.

As illustrated in FIG. 6, the neural network NW includes, for example, a first layer that is an input layer, a second layer, a third layer, and a fourth layer that are intermediate layers (hidden layers), and a fifth layer that is an output layer. The first layer outputs an input value x=(x0, x1, x2, . . . , xp) having p parameters as elements to the second layer as it is. Each of the second layer, the third layer, and the fourth layer converts the total input into an output by an activation function and passes the output to the next layer. The fifth layer also converts the total input into an output by an activation function, and this output is an output vector y=($y_0$, $y_1$, . . . , $y_q$) of a neural network having q parameters as elements.

In the present embodiment, the neural network NW receives the pixel value of each pixel of an image and outputs information indicating the estimation result of the product S. In the input layer of the neural network NW, neurons corresponding to the number of pixels of the image are provided. In the output layer of the neural network NW, neurons for outputting information relevant to the estimation result of the product S are provided. The product S can be estimated based on the output value of the neuron in the output layer. The output value of the neuron is a value between 0 and 1, for example. In this case, the larger the neuron value (the closer the neuron value is to 1), the higher the possibility that the product is an image product, and the smaller the neuron value (the closer the value is to 0), the lower the possibility that the product is an image product. That is, when the neuron value is large, the probability of being the product S is high, and when the neuron value is low, the probability of being the product S is low.

The estimation section 33 inputs an image based on the image data to the learned model. The estimation section 33 may normalize the input image. Image normalization is performed, for example, by performing image reduction, enlargement, trimming, and the like. The estimation section 33 may perform various kinds of processing, such as contrast adjustment, color change, and format change, on the input image. The estimation section 33 acquires an estimation result including an output value output from the neural network NW in response to the input of an image to the neural network NW of the learned model. The estimation result includes all types of products registered in the product master.

The estimation section 33 ranks product candidates based on the estimation result. Specifically, the estimation section 33 ranks products in order from a product with the largest neuron value. The estimation section 33 generates estimation information, in which product numbers and ranks are associated with each other, for all types of products. The estimation section 33 outputs the estimation information and the image information of the image used for the estimation processing to the control section 34.

When the image information and the estimation information are output from the estimation section 33, the control section 34 displays the image information and the estimation information on the touch panel display 31. The control section 34 controls the display of the touch panel display 31 based on the input received on the touch panel display 31. Specifically, the control section 34 displays all image of the product S based on the image information on one screen displayed on the touch panel display 31. The control section 34 displays the product names of products with high ranks, among the product candidates in the estimation information, on one screen. Details of the control of the touch panel display 31 in the control section 34 will be described later. The control section 34 outputs number information indicating the product number to the output section 36 based on the estimation information or the input received on the touch panel display 31. The output section 36 outputs the number information to the weighing device 2.

The storage section 35 stores a product master. This product master is configured to include the same content as the product master stored in the storage section 26 of the weighing device 2. The storage section 35 stores a learned model. The storage section 35 stores a learned model acquired through a storage medium, a network, or the like.

Next, the operation of the weighing machine 1 will be described. In the following description, a form in which a store clerk operates the weighing machine 1 as an operator will be described as an example.

Figure 7:
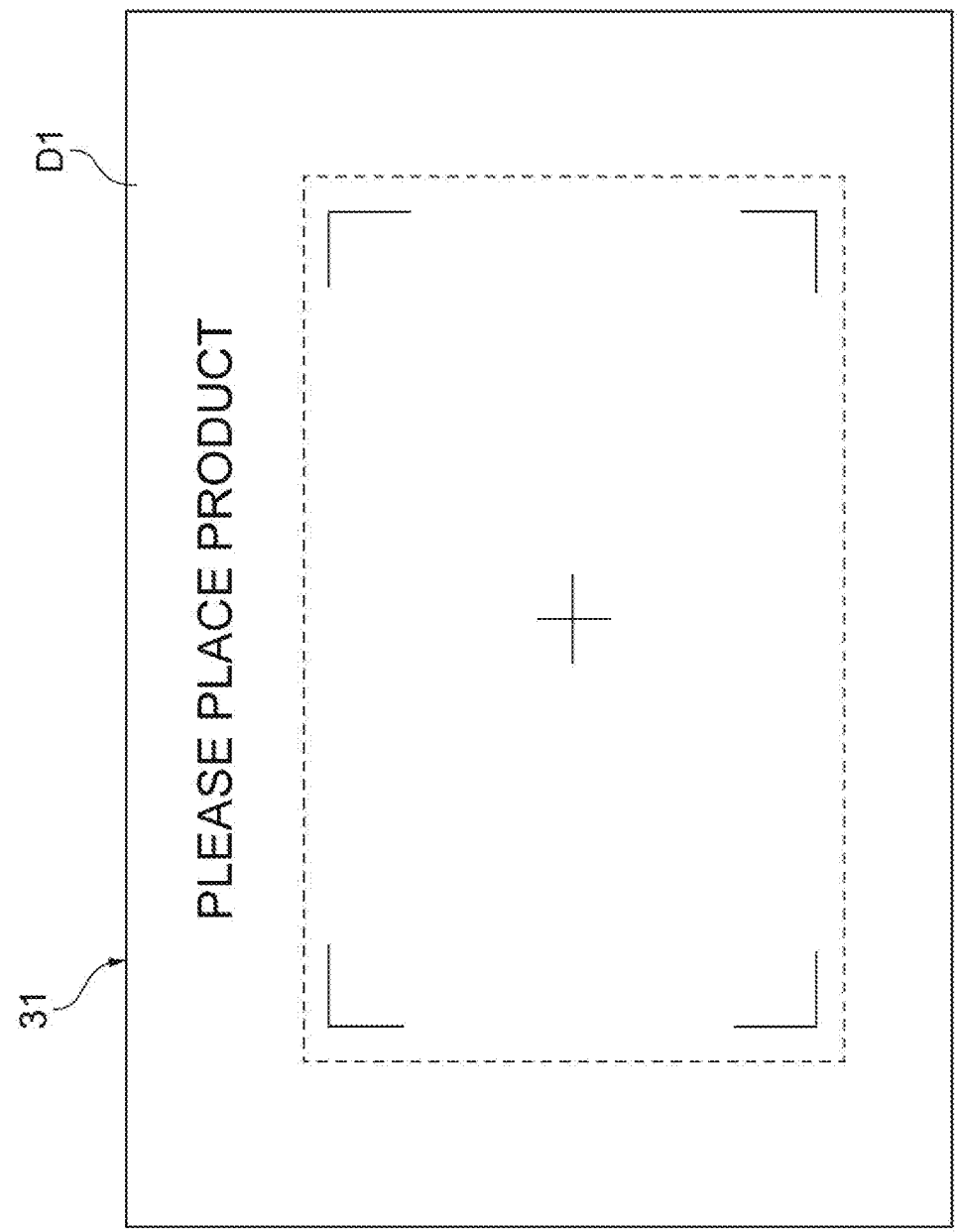
FIG. 7 is a diagram illustrating an example of a screen displayed on a touch panel display of the control device.

As illustrated in FIG. 7, when the product S is not placed on the weighing device 2, the control device 3 causes the touch panel display 31 to display a screen D1 that prompts the placement of the product S. In this case, for example, text such as "Please place a product" is displayed on the touch panel display 22a of the weighing device 2. When the product S is placed on the weighing table 21a of the weighing device 2 by the operator, the control device 3 performs estimation processing for the product S.

Figure 8:
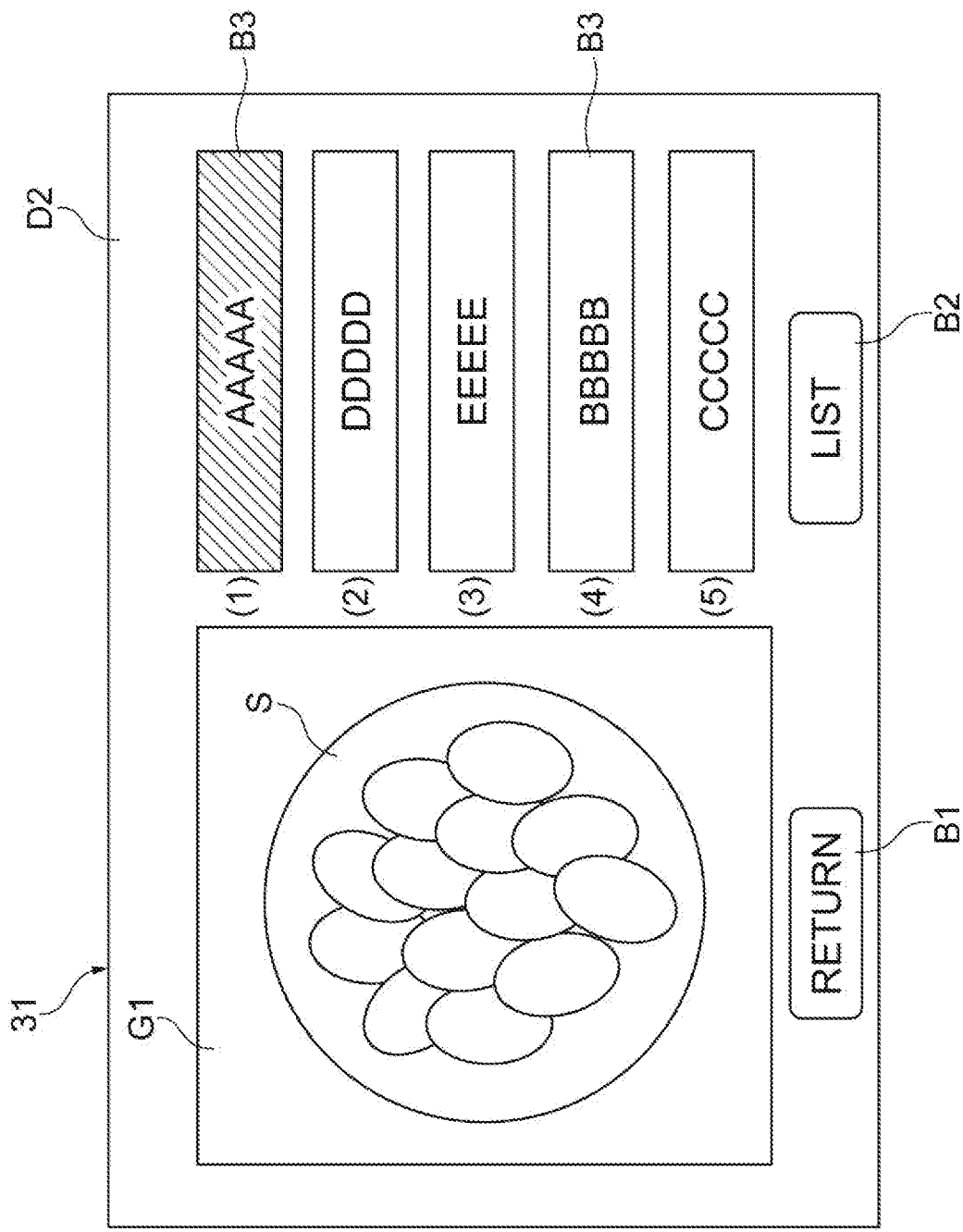
FIG. 8 is a diagram illustrating an example of a screen displayed on the touch panel display of the control device.

When the estimation processing for the product S is performed, the control device 3 displays a screen D2 on the touch panel display 31 as illustrated in FIG. 8. Based on the estimation information, the control device 3 displays an image G1 of the product S and a plurality (five in the present embodiment) of selection buttons 133 on the screen D2. On the selection buttons B3, product names of candidates for the product S are displayed. The product name of each selection button B3 is displayed based on the rank of the estimation result. Specifically, product names are displayed on the selection buttons 133 in descending order from the top. In the example illustrated in FIG. 8, the product name "AAAAA" has the highest rank, and the product name "CCCCC" has the lowest rank. That is, what is estimated to be most likely as the product S placed on the weighing device 2 is "AAAAA", and what is estimated to be the fifth most likely is "CCCCC". In the initial setting (state in which the screen D2 is displayed first), the control device 3 selects the selection button B3 for a product having the highest rank. When the selection button B3 is selected, the selection button B3 is displayed so as to be distinguishable from the other selection buttons B3. For example, when the selection button B3 is selected, the selection button B3 is displayed in a different color from the other selection buttons B3. FIG. 8 illustrates a state in which the selection button B3 for "AAAAA" is selected. The control device 3 outputs number information based on the selected selection button B3 to the weighing device 2.

Figure 9:
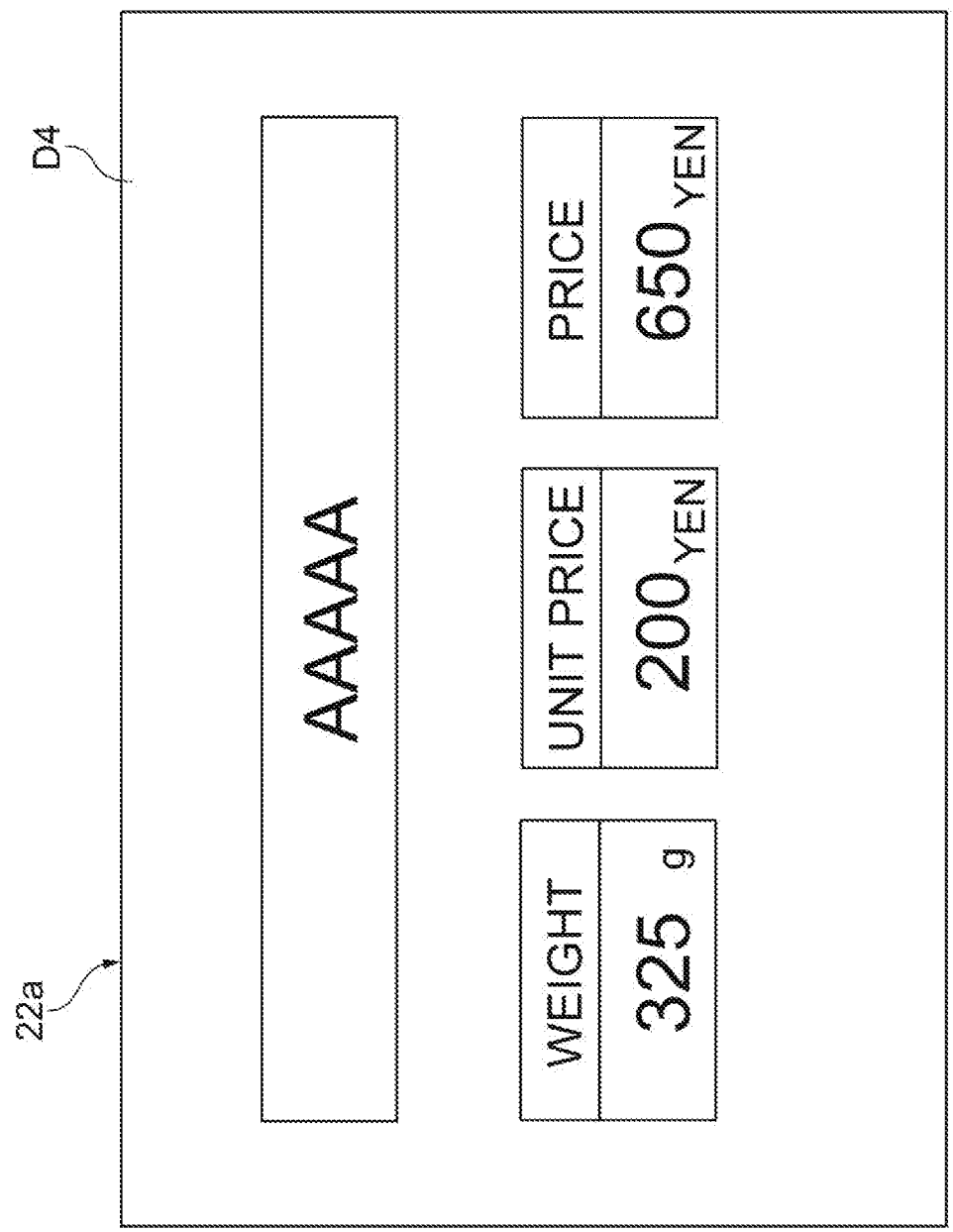
FIG. 9 is a diagram illustrating an example of a screen displayed on the touch panel display of the control device.

When the selection button B3 is selected on the screen D2, the weighing device 2 displays a screen D4 on the touch panel display 22a as illustrated in FIG. 9. On the screen D4, at least the product name (AAAAA), the weight of the product S (325 g), the unit price "200 yen" per 100 g of the product S, and the price "650 yen" of the product S are displayed. In addition, also on the display device 4, the product name, the weight of the product S, the unit price per 100 g of the product 5, and the price of the product S are displayed.

The control device 3 displays the button B1 and the button B2 on the screen D2. "Return" is displayed on the button B1. "List" is displayed on the button B2.

When the product S displayed in the image G1 and the product name (for example, "AAAAA") of the selected selection button B3 match each other on the screen D2, the operator removes the product S from the weighing table 21a of the weighing device 2. When the product S displayed in the image G1 and the product of the selected selection button B3 do not match each other, the operator presses another selection button B3 to designate a product name and then removes the product S from the weighing table 21a of the weighing device 2. The weighing device 2 issues the label LC when it is determined that the product S has been removed from the weighing table 21a. The operator attaches the issued label LC to the product S.

When the product S displayed in the image G1 has a defect on the screen D2, the operator presses the button B1. The control device 3 acquires new image data captured by the camera 5 when the button B1 is pressed. The control device 3 performs the processing for estimating the product S again based on the acquired image data, and displays the processing result on the screen D2.

Figure 10:
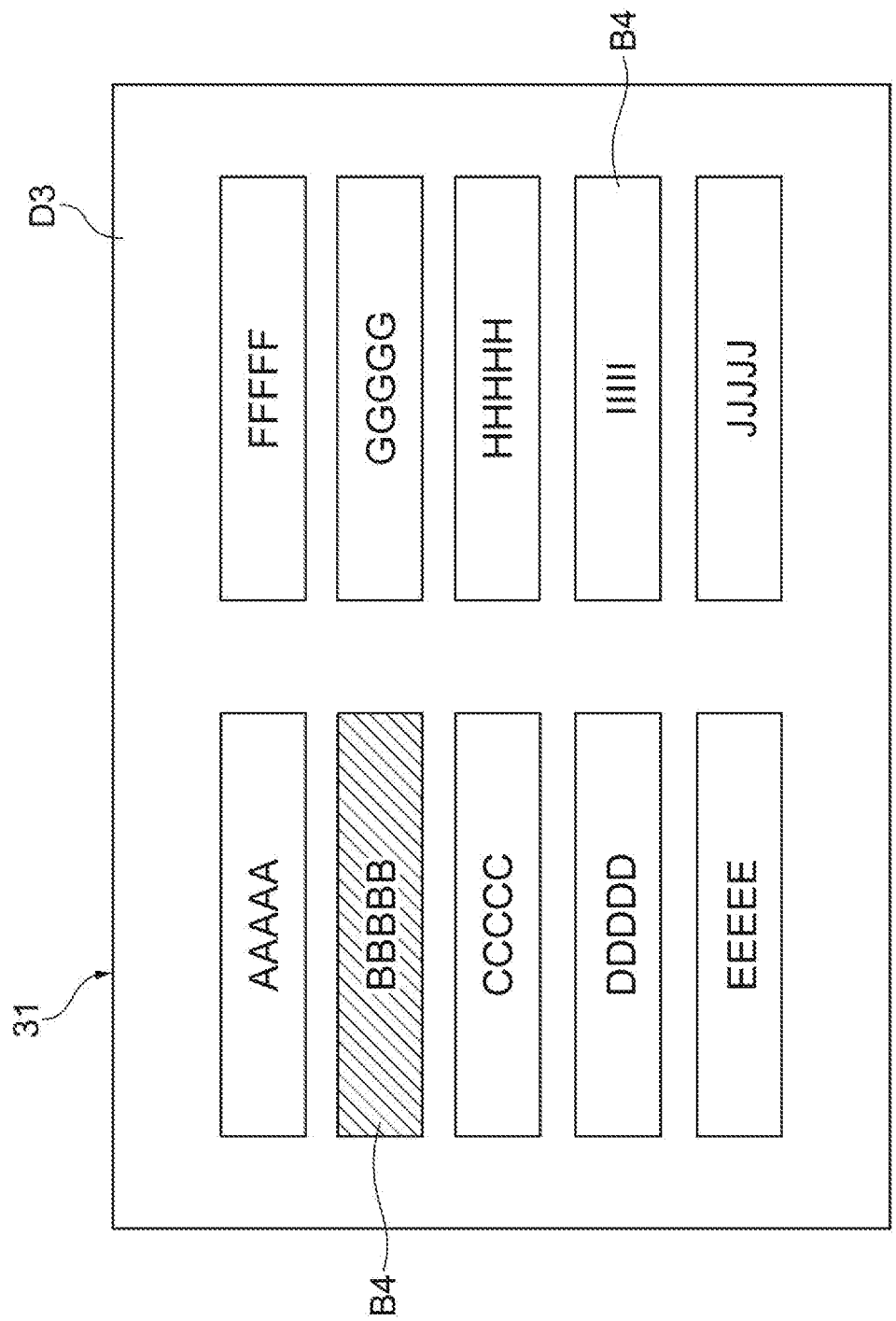
FIG. 10 is a diagram illustrating an example of a screen displayed on the display device.

When the product name corresponding to the product S is not displayed on the selection button B3 on the screen D2, the operator presses the button B2. When the button B2 is pressed, the control device 3 displays a screen D3 as illustrated in FIG. 10. A plurality (ten in the present embodiment) of selection buttons B4 are displayed on the screen D3. Product names are displayed on the selection buttons B4. The product name of each selection button B4 is displayed based on the product number. The selection buttons B4 as many as the number of products registered in the product master are displayed on the screen D3 of a list. The list screen D4 may be displayed on a plurality of screens. When the selection button B4 is selected, the selection button B4 is displayed so as to be distinguishable from the other selection buttons B4. In addition, products with low probability may not be displayed on the screen D3 of a list. That is, products whose neuron values are equal to or less than a threshold value may not be displayed.

The operator selects the selection button B4 on the screen D3, and then removes the product S from the weighing table 21a of the weighing device 2. The weighing device 2 issues the label LC when it is determined that the product S has been removed from the weighing table 21a. When the label LC is issued in the weighing device 2, the control device 3 displays the screen D1 illustrated in FIG. 7 on the touch panel display 31.

As described above, in the weighing machine 1 according to the present embodiment, when the product S is removed from the weighing table 21a, the price calculated by the calculation section 27 of the weighing device 2 is set and the label LC on which price is printed is issued by the label issuing unit 23. Therefore, in the weighing machine 1, even if an operation for issuing the label LC is not performed, the label LC can be issued by the label issuing unit 23. As a result, since the weighing machine 1 does not require an operation for generating the label LC, operability can be improved.

In the weighing machine 1 according to the present embodiment, the control section 28 of the weighing device 2 determines whether or not the product S has been removed from the weighing table 21a based on a change in the measurement value of the product in the weighing unit 21. Specifically, the control section 28 determines that the product S has been removed from the weighing table 21a when the measurement value becomes zero in the weighing unit 21. In this configuration, it is not determined that the product S has been removed with a slight change in the measurement value due to vibration or the like. Therefore, in the weighing machine 1, it is possible to more reliably determine that the product S has been removed from the weighing table 21a. In addition, when the product S is lifted from the weighing table 21a, it is determined that the product S has been removed from the weighing table 21a. Therefore, the amount of the product S can be increased in a state in which the product S is placed on the weighing table 21a.

The weighing machine 1 according to the present embodiment includes the camera 5 that images the product S placed on the weighing table 21a. The control device 3 includes the estimation section 33 that estimates the type of the product S based on the image captured by the camera 5. The calculation section 27 of the weighing device 2 calculates the price of the product S estimated by the estimation section 33. In this configuration, the product S is estimated and the price is calculated even if the operator does not perform an operation of designating (selecting) the product S. Therefore, since the weighing machine 1 does not require an operation for designating the product S, operability can be further improved.

In the weighing machine 1 according to the present embodiment, the estimation section 33 determines whether or not the position of the product S has been determined on the weighing table 21a based on a plurality of images captured by the camera 5, and estimates the type of the product S based on one image determined that the position has been determined when it is determined that the position of the product S has been determined. In this configuration, since the type of the product S is estimated based on the image when the position of the product S is determined, that is, the image of the product stably placed on the weighing table 21a, the type of the product S can be estimated with high accuracy.

In the weighing machine 1 according to the present embodiment, the control device 3 includes the touch panel display 31 for displaying an image captured by the camera 5. The touch panel display 31 displays an image of the product S. In this configuration, the touch panel display 31 displays an image used for estimating the product S. Therefore, for example, it is possible to check a problem, such as an operator's hand appearing in the image.

In the weighing machine 1 according to the present embodiment, the touch panel display 31 receives an input for instructing the estimation section 33 to estimate the product S again after displaying the image of the product S. When the touch panel display 31 receives an instruction input, the estimation section 33 estimates the type of the product S based on an image newly captured by the camera 5. If the position of the product S is shifted or the operator's hand appears in the image displayed on the touch panel display 31, the type of the product S may not be estimated correctly. In the weighing machine 1, when the touch panel display 31 receives an instruction input, the estimation section 33 estimates the type of the product S based on an image newly captured by the camera 5. Therefore, in the weighing machine 1, the type of the product S can be estimated with high accuracy.

In the weighing machine 1 according to the present embodiment, the estimation section 33 estimates a plurality of product candidates. The touch panel display 31 displays a plurality of product candidates and receives an input for designating one product among the plurality of product candidates. The calculation section 27 calculates the price of the product designated by the touch panel display 31. In this configuration, the operator can select the type of the product. Therefore, in the weighing machine 1, it is possible to reliably avoid that the price of a product different from the actual product S is calculated.

In the weighing machine 1 according to the present embodiment, the estimation section 33 sets the ranks of a plurality of product candidates in descending order of the probability that each product candidate is the product S placed on the weighing table 21a. The touch panel display 31 displays a plurality of product candidates based on the order set by the estimation section 33. In this configuration, since candidate products are displayed in descending order of the probability on the touch panel display 31, the operator can easily designate a product.

The weighing machine 1 according to the present embodiment includes at least the first lighting unit 6 and the second lighting unit 7 that emit light to the weighing table 21a. The camera 5 is disposed above the weighing table 21a. The first lighting unit 6 and the second lighting unit 7 are located so as to interpose the camera 5 therebetween above the weighing table 21a, and are disposed such that the optical axis of light is inclined with respect to the weighing table 21a. In this configuration, for example, when light is emitted to the product S, it is possible to suppress light reflected by the product S from appearing in the image captured by the camera 5.

While the embodiment of the invention has been described above, the invention is not necessarily limited to the embodiment described above, and various changes can be made without departing from the scope of the invention.

In the above embodiment, the form in which a clerk operates the weighing machine 1 as an operator has been described as an example. However, the weighing machine 1 may be operated by the customer. The operation of the weighing machine 1 when the customer operates the weighing machine 1 will be described.

As illustrated in FIG. 7, when the product S is not placed on the weighing device 2, the control device 3 causes the touch panel display 31 to display a screen D1 that prompts the placement of the product S. When the product S is placed on the weighing table 21a of the weighing device 2 by the operator, the control device 3 performs estimation processing for the product S.

Figure 11:
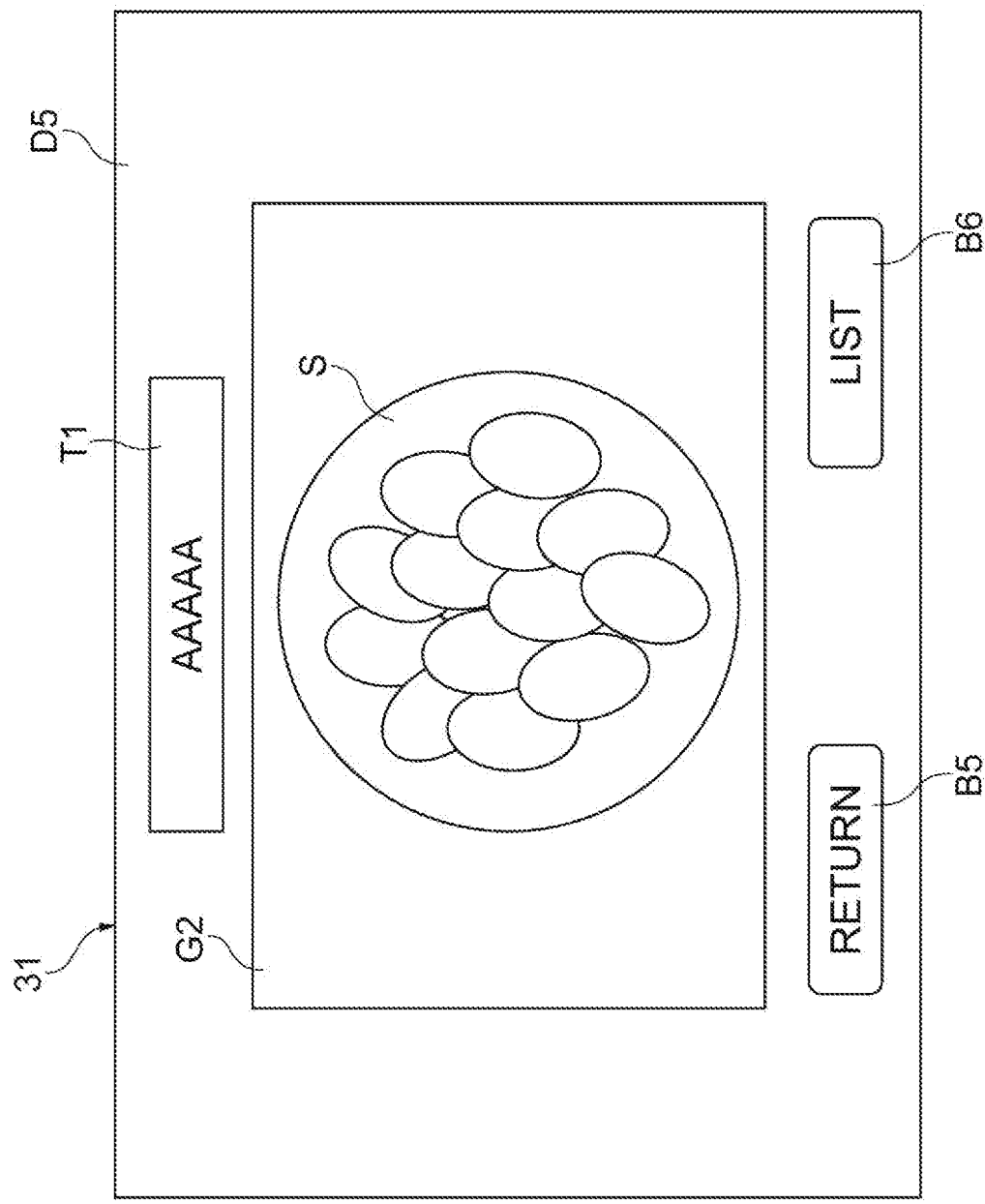
FIG. 11 is a diagram illustrating an example of a screen displayed on the touch panel display of the control device.

After the estimation processing for the product S is performed, the control device 3 displays a screen D5 on the touch panel display 31 as illustrated in FIG. 11. Based on the processing result of the estimation processing, the control device 3 displays a text display portion T1 for displaying the product name of the product S, an image G2 of the product S, a button B5, and a button B6 on the screen D5. "Return" is displayed on the button B5. "List" is displayed on the button B6.

When the product S displayed in the image G2 and the displayed product name match each other on the screen D5, the operator removes the product S from the weighing table 21a of the weighing device 2. The weighing device 2 issues the label LC when it is determined that the product S has been removed from the weighing table 21a. The operator attaches the issued label LC to the product S.

When the product S displayed on the image G2 has a defect or the like on the screen D5, the operator presses the button B1. The control device 3 acquires image data captured by the camera 5 again when the button B1 is pressed. The control device 3 performs processing for estimating the product S based on the acquired image data, and displays the processing result on the screen D5.

Figure 12:
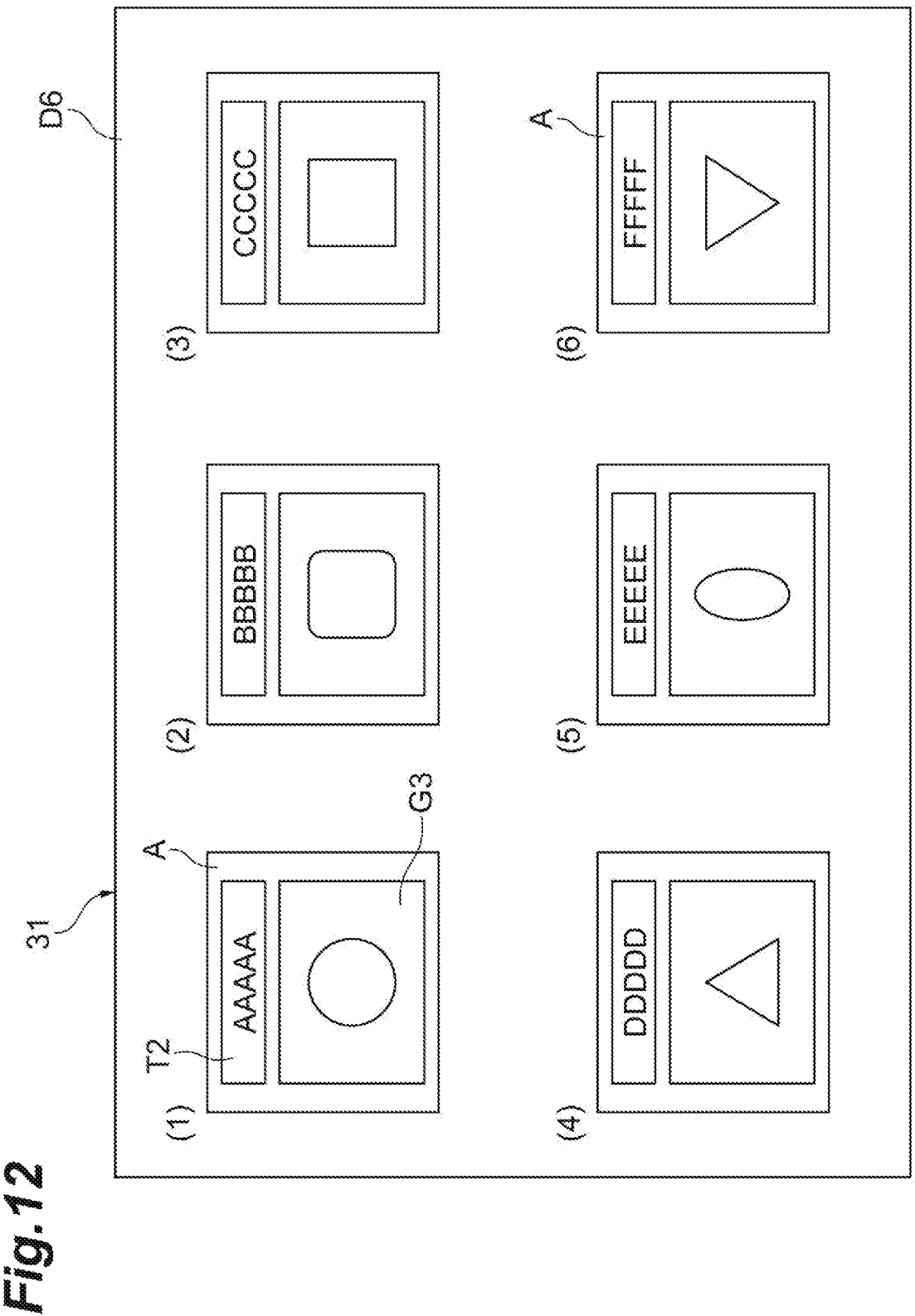
FIG. 12 is a diagram illustrating an example of a screen displayed on the touch panel display of the control device.

When the product S displayed on the image G2 and the displayed product name do not match each other on the screen D2, the operator presses the button B6. When the button B6 is pressed, the control device 3 displays a screen D6 as illustrated in FIG. 12. A plurality (six in the present embodiment) of icons A are displayed on the screen D6. A text display portion T2 for displaying the product name and an image G3 showing the product S corresponding to the product name displayed in the text display portion T2 are displayed in the icon A. The icon A is displayed based on the product number. The icons A as many as the number of products registered in the product master are displayed on the list screen D6. The list screen D6 may be displayed on a plurality of screens.

Figure 13:
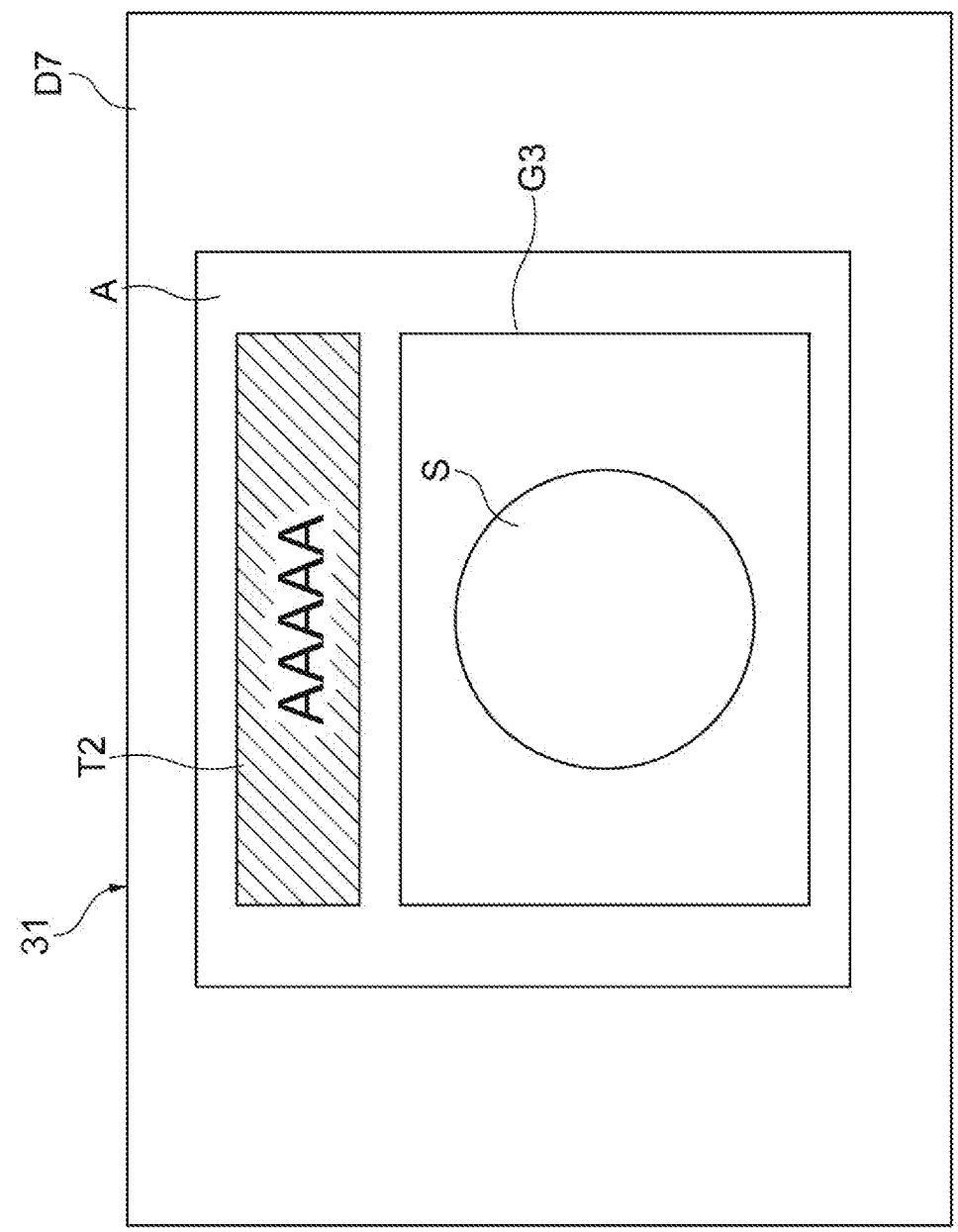
FIG. 13 is a diagram illustrating an example of a screen displayed on the touch panel display of the control device.

The operator selects the icon A corresponding to the product S to be weighed on the screen D6. When the icon A is selected, the control device 3 displays a screen D7 as illustrated in FIG. 13. The selected icon A is enlarged and displayed on the screen D7. After the icon A is displayed on the screen D7, the operator removes the product S from the weighing table 21a of the weighing device 2. The weighing device 2 issues the label LC when it is determined that the product S has been removed from the weighing table 21a. When the label LC is issued in the weighing device 2, the control device 3 displays the screen D1 illustrated in FIG. 7 on the touch panel display 31.

In the above embodiment, the form in which the control device 3 displays the screen D5 on the touch panel display 31 when the estimation processing for the product S is performed and displays the screen D6 when the button B6 is pressed on the screen D5 has been described as an example. However, the control device 3 may switch the display of the touch panel display 31 based on the processing result of the estimation processing for the product S. Specifically, the control device 3 may display the screen D5 when the output value of the neuron is equal to or greater than the threshold value in the processing result of the estimation processing and display the screen D6 when the output value is lower than the threshold value.

In the above embodiment, the form in which the control section 28 determines that the product S has been removed from the weighing table 21a when the measurement value becomes "0" after the measurement value output from the weighing unit 21 is stabilized has been described as an example. However, the control section 28 may determine that the product S has been removed from the weighing table 21a when at least one of a case where the measurement value in the weighing unit 21 becomes smaller by the threshold value or more than the stable measurement value when the measurement is stabilized, a case where the amount of change in the measurement value from the stable measurement value is equal to or greater than the threshold value, and a case where the measurement value is reduced from the stable measurement value is satisfied. A case where the amount of change in the measurement value from the stable measurement value is equal to or greater than the threshold value includes a case where the measurement value increases and a case where the measurement value decreases.

When determining whether or not the product S has been removed from the weighing table 21a based on the amount of change in the measurement value from the stable measurement value, the control section 28 performs the following processing. After determining that the product S has been removed from the weighing table 21a and causing the label issuing unit 23 to issue the label LC, the control section 28 does not output setting information to the calculation section 27 until the measurement value becomes "0". That is, the control section 28 does not allow the next label LC to be issued until the measurement value becomes "0". Therefore, it is possible to avoid issuing a plurality of labels LC for the same product S.

In the above embodiment, the form in which the estimation section 33 detects that the product S has been placed on the weighing table 21a of the weighing device 2 based on the image data output from the input section 32 has been described as an example. However, the estimation section 33 may detect that the product S has been placed on the weighing table 21a of the weighing device 2 based on the measurement value of the weighing unit 21 of the weighing device 2. In addition, the estimation section 33 may detect that the product S has been placed on the weighing table 21a of the weighing device 2 based on the image data output from the input section 32 and the measurement value of the weighing unit 21 of the weighing device 2.

In the above embodiment, the faun in which the estimation section 33 of the control device 3 determines whether or not the placement of the product S is stable using the inter-frame difference method of consecutive pieces of image data has been described as an example. However, the estimation section 33 may determine whether or not the placement of the product S is stable based on the measurement value of the weighing unit 21 of the weighing device 2. In addition, the estimation section 33 may determine whether or not the placement of the product S is stable based on the inter-frame difference method of continuous pieces of image data and the measurement value of the weighing unit 21 of the weighing device 2.

In the above embodiment, the form in which the product S placed on the weighing table 21a is estimated based on image data captured by the camera 5 has been described as an example. However, the product S may be selected by the operation unit 22 of the weighing device 2. That is, the weighing machine 1 may not include the control device 3 and the camera 5. In this configuration, the weighing device 2 issues the label LC when it is determined that the product S has been removed from the weighing table 21a after the product S is selected on the touch panel display 22a of the operation unit 22. As a use scene, for example, in a face-to-face measurement sale, a scene in which an operator increases or decreases the amount of product in a package to a desired weight can be considered. An operator (a clerk or a customer himself or herself) selects (performs an input operation of) the type of a product using the operation unit 22 and places a package (product) on the weighing table 21a. Then, the operator increases or decreases the weight of the product in the package according to the customer's request or the like, and removes the package (product) from the weighing table 21a when it is recognized that the weight of the product has reached the desired weight. In this case, the control section 28 can be configured to determine that the product has been removed based on the measurement value (specifically, when the measurement value is changed from the stable measurement value to 0 or when the measurement value is reduced from the stable measurement value by a predetermined threshold value) and cause the label issuing unit 23 to issue the label LC (or transmit the price information to the server). This eliminates the need for the operator to perform a separate input operation for starting label issuance (or price information transmission). As a result, there is no need for the operator to perform an operation for issuing the label LC.

In the above embodiment, the form in which the removal of the product S from the weighing table 21a is determined based on the measurement value of the weighing unit 21 has been described as an example. However, the removal of the product S from the weighing table 21a may be determined based on the image captured by the camera 5. In this configuration, the control device 3 determines whether or not the product S has been removed from the weighing table 21a based on the base image (background image) and the image data output from the camera 5.

Specifically, the control device 3 makes a determination based on the similarity with (difference from) the base image. When the product S is placed on the weighing table 21a, the similarity between the image of the image data and the base image is low, and when the product S is not placed on the weighing table 21a, the similarity between the image of the image data and the base image is high. When the similarity is equal to or less than the threshold value, the control device 3 determines that the product S is placed on the weighing table 21a. When the similarity is higher than the threshold value, the control device 3 determines that the product S has been removed from the weighing table 21a. When it is determined that the product S has been removed from the weighing table 21a, the control device 3 outputs information indicating the situation to the weighing device 2. When the information output from the control device 3 is received, the weighing device 2 issues the label LC. In addition, after the product S is placed on the weighing table 21a and the product S is estimated, when there is a change from the image from which the product S has been estimated (for example, when there is a change of a threshold value or more in the similarity with respect to the immediately preceding image), the control device 3 may determine that the product S has been removed from the weighing table 21a. In addition, when comparing the similarity between the base image (or the immediately preceding image) and the current image, each image may be compared after being appropriately reduced from the captured image. In this case, the load on the similarity calculation processing is reduced, and erroneous determination due to slight misalignment of an object to be imaged in the image is reduced. In addition, when comparing the similarity between the base image (or the immediately preceding image) and the current image, the range to be compared may be limited to an area (and its surroundings) recognized as a product, instead of the entire captured range.

In the above embodiment, the form in which the estimation section 33 determines whether or not the position of the product S has been determined based on the inter-frame difference method of consecutive pieces of image data has been described as an example. However, the method for determining whether or not the position of the product S has been determined is not limited to this. For example, the estimation section 33 may determine that the position of the product S has been determined when the measurement value of the weighing unit 21 is stable for a predetermined time.

In the above embodiment, the form in which the weighing device 2 issues the label LC when the product S is removed from the weighing table 21a has been described as an example. However, when the product S is removed from the weighing table 21a, the weighing device 2 may transmit price information including at least the price of the product to a predetermined server apparatus. Specifically, when the product S is removed from the weighing table 21a, the control section 28 of the weighing device 2 causes the output section 29 to output information including the price.

In this configuration, for example, by transmitting price information to a predetermined server apparatus managed by the store, payment with a credit card or the like registered in advance by the customer becomes possible. As a result, payment at the store can be omitted. In addition, the output section 29 outputs the price to a payment machine installed in the store, so that payment at the payment machine can be made without going through a cash register, or the amount charged for other products can be automatically added.

In the above embodiment, the form in which the touch panel display 31 of the control device 3 is disposed on the holding unit 12 of the housing 10 has been described as an example. However, the touch panel display 31 may be disposed at a position other than the holding unit 12. The touch panel display 31 is preferably disposed near the weighing device 2.

In the above embodiment, the form in which the estimation section 33 estimates the type of the product S using the learned model has been described as an example. However, the estimation section 33 may estimate the type of the product S by matching with a sample image, for example.

In the above embodiment, the form in which the weighing machine 1 includes the display device 4 has been described as an example. However, for example, when the customer operates the weighing machine 1, the display device 4 may not be provided.

In the above embodiment, the form in which the product S is weighed by the weighing device 2 and the product S is estimated by the control device 3 has been described as an example. However, one device may have the functions of the weighing device 2 and the control device 3.

In the above embodiment, the form in which the weighing device 2 and the control device 3 are provided in the housing 10 has been described as an example. However, the form of the weighing machine 1 is not limited to this. The form of a so-called separation scale in which the weighing device 2 (weighing table 21a) and the control device 3 are separately provided may be applied.

In the above embodiment, the form in which two of the first lighting unit 6 and the second lighting unit 7 are provided has been described as an example. However, one lighting unit (for example, one of the two first lighting unit 6 and second lighting unit 7 or a lighting unit provided above a position, which is opposite to a position where the operator stands when viewed from the weighing table 21a and at which the weighing table 21a is interposed between the operator and the position when the operator performs placement) or a plurality (three or more) of lighting units may be provided.

In the above embodiment, an example has been described in which the weight of the product S, in which the article G is contained in the package P, is measured. However, the product S may be fruits, vegetables, and the like that are not contained in the package. In addition, although an example has been described in which the camera 5 images the article G in the package P by imaging light transmitted through the transparent lid of the package P, the camera 5 may image a product with an opaque package containing the article G that cannot be imaged. In this case, the estimation section 33 may estimate the type of the product based on the appearance of the product S (such as a print on the opaque package).

In the above embodiment, the form in which the camera 5, the first lighting unit 6, and the second lighting unit 7 are disposed in the housing 10 and the weighing unit 21 is provided integrally with the weighing device 2 has been described as an example. However, as illustrated in FIG. 14, FIG. 15, FIG. 16, FIG. 17, or FIG. 18, a camera 5A, a lighting unit 45, and the weighing unit 21 may be disposed in a support body 40.

The support body 40 includes a base unit 41, a support unit 42, and a holding unit 43. The base unit 41 is a plate-shaped member. The base unit 41 has a rectangular shape, for example. A support leg 41a is provided at the bottom of the base unit 41. A plurality of support legs 41a are provided in the base unit 41 (for example, the support leg 41a is provided at four locations). The support leg 41a has a mechanism capable of adjusting the height position of the base unit 41. By operating the support leg 41a, the height position of the base unit 41 can be adjusted (the base unit 41 is adjusted so as to be horizontal).

The support unit 42 is a columnar member. The support unit 42 is erected on the base unit 41 and extends along the vertical direction. The support unit 42 is disposed at the center in the width direction of the base unit 41 in the rear portion of the base unit 41. The support unit 42 has a hollow structure. Therefore, a cable or the like can pass through the support unit 42. In the examples illustrated in FIGS. 14 and 15, one support unit 42 is illustrated, but a plurality of support units 42 may be provided.

In addition, the support unit 42 may be configured so as to be able to expand and contract. In this case, it is preferable that the support unit 42 has an adjustment mechanism whose height (length) can be adjusted stepwise, for example. Therefore, it is possible to adjust the distance between the weighing unit 21 (weighing table 21a) and the camera 5A and the lighting unit 45, which will be described later. For example, when the weighing table 21a is replaced with a weighing table having a relatively large area or when it is necessary to image a relatively large (large-area) product, it is desirable that the camera 5A and the lighting unit 45 become further away from the weighing table 21a by expanding the support unit 42 so that the weighing table 21a or the product fits in the imaging range. On the other hand, when the weighing table 21a is replaced with a weighing table having a relatively small area or when a relatively small (small-area) product is imaged, it is desirable that the camera 5A and the lighting unit 45 become closer to the weighing table 21a by contracting the support unit 42 so that the area occupied by the product that fits in the imaging range increases or the illumination light hits the product as strongly as possible.

The holding unit 43 is provided at the upper end portion of the support unit 42. The holding unit 43 has a box shape. The front surface and the rear surface (side surface) of the holding unit 43 are inclined with respect to the support unit 42 by, for example, about 30°. The holding unit 43 may be provided on the support unit 42 so as to be swingable. Therefore, the holding unit 43 can adjust the inclination angle with respect to the base unit 41 and the support unit 42. An end portion of the holding unit 43 on the base unit 41 side is open. The opening of the holding unit 43 is disposed at a position facing the base unit 41.

Figure 14:
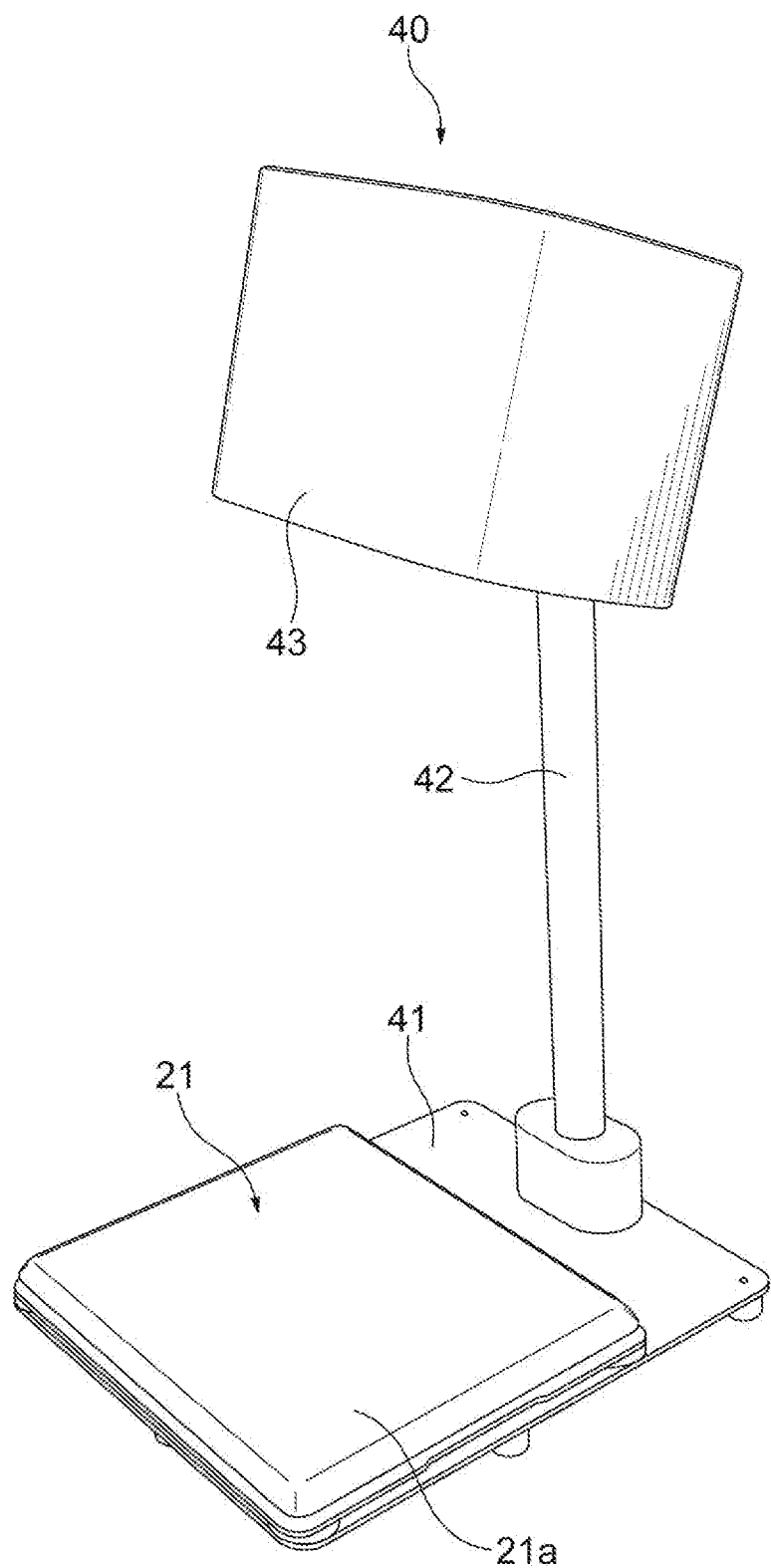
FIG. 14 is a perspective view illustrating a support body.
Figure 15:
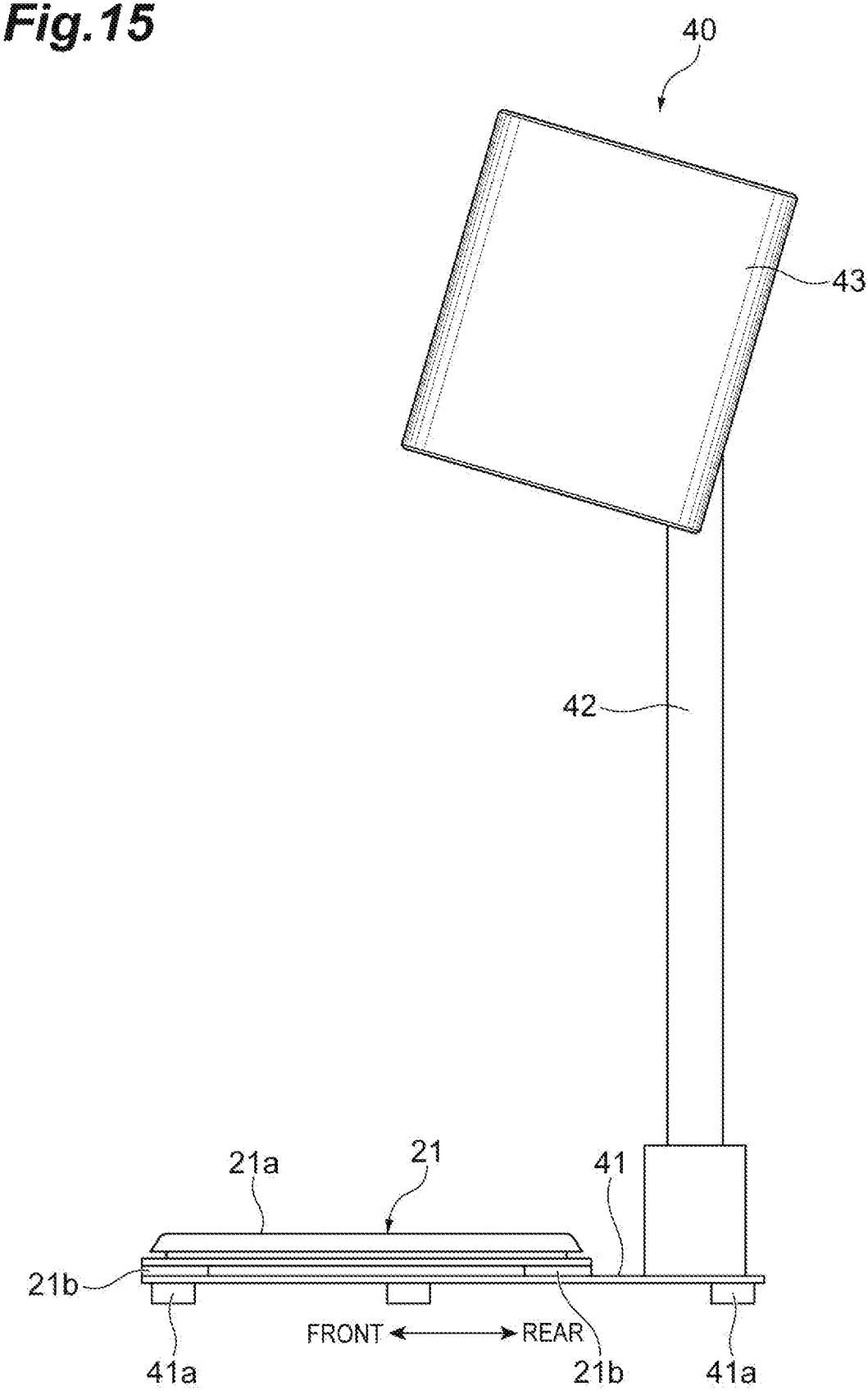
FIG. 15 is a side view of the support body illustrated in FIG. 14.

As illustrated in FIGS. 14 and 15, the weighing unit 21 is disposed on the base unit 41. The weighing unit 21 is disposed on the front side of the base unit 41. The weighing table 21a of the weighing unit 21 may be colored blue, for example. As a result, the product S and the weighing table 21a (background) can be appropriately separated from each other in the image captured by the camera 5A. An adjuster 21b may be provided at the bottom of the weighing unit 21. The adjuster 21b is disposed at four corners of the bottom of the weighing unit 21, for example. The adjuster 21b has a mechanism capable of adjusting the height position of the weighing unit 21. By operating the adjuster 21b, the height position of the weighing unit 21 (weighing table 21a) can be adjusted (weighing unit 21 (weighing table 21a) can be adjusted so as to be horizontal).

Figure 16:
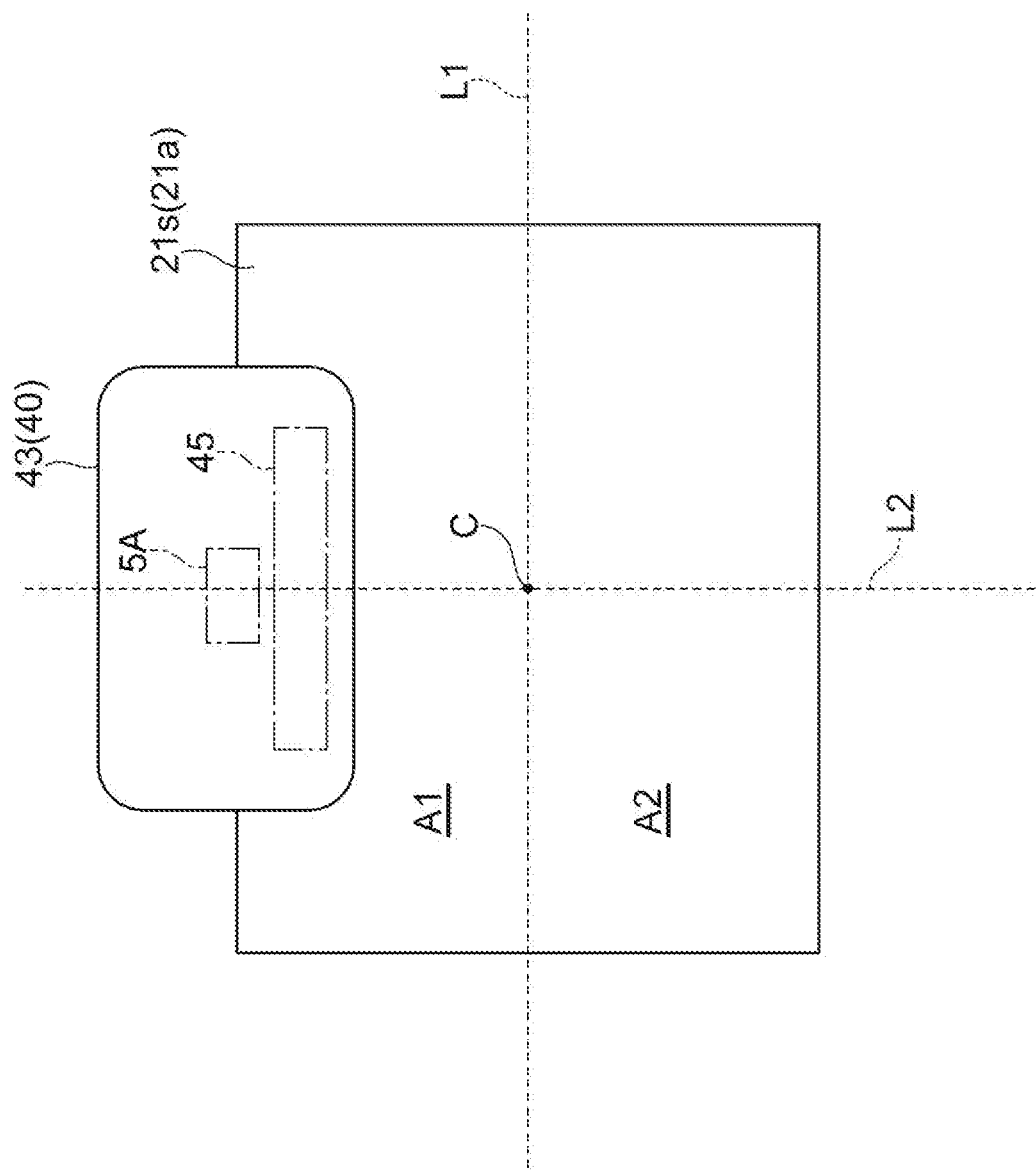
FIG. 16 is a diagram illustrating a positional relationship among a weighing table, a camera, and a lighting unit.
Figure 17:
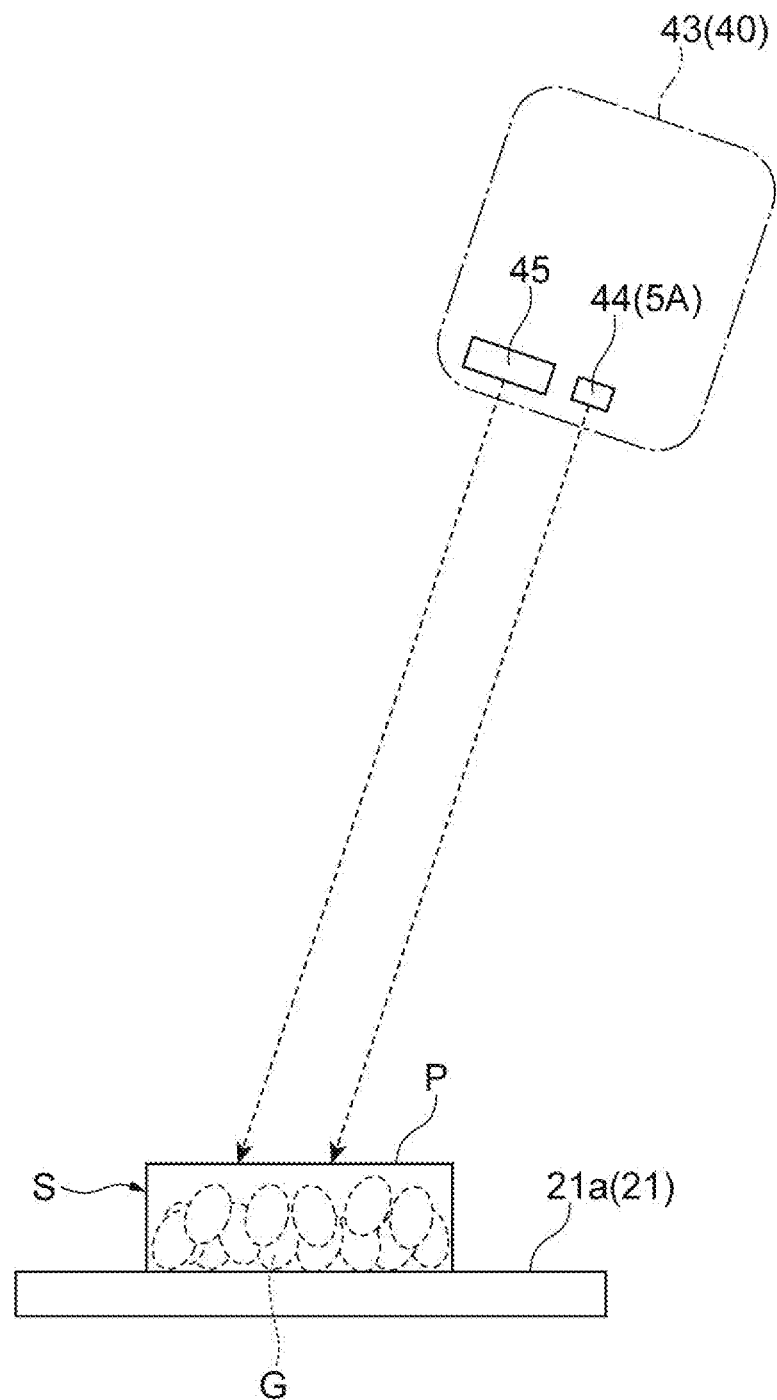
FIG. 17 is a diagram illustrating a positional relationship among a weighing table, a camera, and a lighting unit.

As illustrated in FIGS. 16 to 18, the camera 5A and the lighting unit 45 are disposed in the holding unit 43. Therefore, the camera 5A and the lighting unit 45 are located above the weighing unit 21 (weighing table 21a). In addition, the camera 5A and the lighting unit 45 are located on the rear side of the base unit 41 (weighing unit 21). As illustrated in FIG. 15, for example, the camera 5A and the lighting unit 45 are located on the rear side from the center of the weighing table 21a in a side view. Specifically, as illustrated in FIG. 16, the camera 5A and the lighting unit 45 are disposed on a side of one area A1 of two areas A1 and A2 of a placement surface 21s, which are defined by a first straight line L1 passing through a center C of the placement surface 21s, as viewed from a direction perpendicular to the placement surface 21s of the weighing table 21a. The camera 5A and the lighting unit 45 are disposed on a second straight line L2 perpendicular to the first straight line L1. In the present embodiment, the placement surface 21s has an approximately rectangular shape. The first straight line L1 extends in parallel with one side of the placement surface 21s, and the second straight line L2 extends in parallel with the other side of the placement surface 21s. As illustrated in FIG. 17, the camera 5A is disposed such that the axis of the camera 5A in the imaging direction is inclined with respect to the weighing table 21a. The axis of the camera 5A in the imaging direction is, for example, an axis along the extending direction of a straight line perpendicular to the center of the lens surface of a lens 44. The lighting unit 45 is disposed such that the optical axis of incident light is inclined with respect to the weighing table 21a. In the present embodiment, the camera 5A and the lighting unit 45 are disposed such that the axis of the camera 5A in the imaging direction and the optical axis do not cross each other. In addition, the angle and the height of the camera 5A are adjusted so that the imaging range and the entire weighing unit 21 (weighing table 21a) match each other.

The holding unit 43 and the camera 5A and the lighting unit 45, which are located inside the holding unit 43, may be configured such that the inclination angle with respect to the support unit 42 can be changed. The inclination angles of the holding unit 43 and the camera 5A and the lighting unit 45 located inside the holding unit 43 are changed according to the size (area) or the height of the product so that the product fits in the imaging range appropriately.

As illustrated in FIG. 18, the lens 44 of the camera 5A is disposed at the approximate center of the holding unit 43 when the holding unit 43 is viewed from the opening side. The lighting unit 45 is, for example, an LED light. The lighting unit 45 extends along the width direction (horizontal direction in FIG. 18) of the holding unit 43. In the lighting unit 45, a plurality of LED elements are arranged at predetermined intervals in a two-dimensional manner. Therefore, light is uniformly emitted from the lighting unit 45. For this reason, a product appearing in the captured image appears with almost the same brightness at any position. As a result, product recognition processing can be accurately performed. In addition, the lighting unit 45 may be divided into a plurality of parts.

The lighting unit 45 is disposed in front of the lens 44 of the camera 5A. Therefore, as illustrated in FIG. 17, the height position of the lighting unit 45 with respect to the weighing table 21a is higher than the height position of the camera 5A with respect to the weighing table 21a. In other words, the height position of the camera 5A with respect to the weighing table 21a is lower than the height position of the lighting unit 45 with respect to the weighing table 21a. Therefore, it is possible to avoid that the light of the lighting unit 45 hits the camera 5A (lens 44) directly. For this reason, it is possible to avoid a problem that the product cannot be appropriately imaged due to light directly hitting the camera 5A (for example, due to generation of a white spot at a location where direct light is captured in a captured image).

In addition, the lighting unit 45 is disposed at a position closer to the vertical upper side of the center of the weighing table 21a (furthermore, the imaging region of the camera 5A adjusted so as to almost match the weighing table 21a) than the camera 5A. Therefore, light emitted from the lighting unit 45 becomes more perpendicular to the placement surface of the weighing table 21a. As a result, compared with a case where the lighting unit 45 is disposed behind the lens 44 of the camera 5A, a large amount of light emitted from the lighting unit 45 and diffused by the product is incident on the camera 5A. Therefore, the product appearing in the image captured by the camera 5A becomes clearer.

The holding unit 43 has a transparent plate 46. The transparent plate 46 is disposed so as to close the opening of the holding unit 43. The transparent plate 46 covers the entire area of the lighting unit 45 so that the hand does not directly touch the lighting unit 45. A lens hole 46a and a ventilation hole 46b are provided in the transparent plate 46. The lens hole 46a has, for example, a circular shape. The lens 44 of the camera 5A is located in the lens hole 46a. The lens 44 is disposed so as to protrude from the transparent plate 46 in the lens hole 46a. Therefore, the transparent plate 46 does not interfere with the imaging of the camera 5A. In addition, the ventilation hole 46b has, for example, a circular shape. A plurality of ventilation holes 46b are provided. The ventilation hole 46b releases heat in the holding unit 43 to suppress heat from being trapped in the holding unit 43. The ventilation hole 46b is not provided at a position facing the lighting unit 45. Therefore, since the ventilation hole 46b does not directly interfere with light emitted from the lighting unit 45, there is no influence on the intensity of emitted light (for example, unevenness of the emission intensity does not occur).

In the above configuration, the weighing unit 21, the camera 5A, and the lighting unit 45 are integrally held by the support body 40. Thus, by providing the weighing unit 21, the camera 5A, and the lighting unit 45 separately from the weighing device 2, it is possible to improve the mobility of the weighing unit 21. Therefore, it is possible to increase the degree of freedom of the layout in a store. In addition, since the weighing unit 21, the camera 5A, and the lighting unit 45 are integrally held by the support body 40, it is not necessary to move the camera 5A and the lighting unit 45 separately from the weighing unit 21. Therefore, it is possible to improve operability. In addition, it is possible to reduce the size.

The camera 5A is located above the weighing table 21a in the support body 40, and is disposed such that the axis of the camera 5A in the imaging direction is inclined with respect to the weighing table 21a. The lighting unit 45 is located above the weighing table 21a in the support body 40, and is disposed such that the optical axis is inclined with respect to the weighing table 21a. In this configuration, when light is emitted to the product, it is possible to suppress light reflected by the product (in particular, in the case of a product with a package, light reflected by the lid of the package that is almost horizontal with respect to the placement surface of the weighing table 21a) from appearing in the image captured by the camera 5A. In addition, the camera 5A and the lighting unit 45 are disposed such that the axis of the camera 5A in the imaging direction and the optical axis of light from the lighting unit 45 do not cross each other. In this configuration, it is possible to further suppress the light reflected by the product from appearing in the image captured by the camera 5A.

The lighting unit 45 is disposed at a position closer to the center of the weighing table 21a than the camera 5A in the front-rear direction. Therefore, light can be appropriately emitted to the product. For this reason, the product can be imaged more clearly. As a result, it is possible to improve the accuracy of product estimation.

One support body 40 may be provided in the weighing machine 1, or a plurality of support bodies 40 may be provided in the weighing machine 1. That is, a plurality of weighing units 21 may be provided. In the configuration including a plurality of support bodies 40, for example, the weighing units 21 used by the operator are switched and used.

What is claimed is:

1. A weighing machine, comprising:
   a scale configured to measure a weight of a product placed on a weighing table; and
   a processor configured to calculate a price of the product based on the weight of the product measured by the scale,
   wherein the processor sets the price calculated on the basis of the weight of the product immediately after the product is removed from the weighing table as a final price.

2. The weighing machine according to claim 1, further comprising:
   a printer configured to print the price of the product on a label,
   wherein the processor outputs the final price of the product to the printer.

3. The weighing machine according to claim 1, wherein the processor determines that the product has been removed from the weighing table in a case where a measurement value of the scale has declined to a threshold value or more from a stable measurement value, or a case where the measurement value has returned from the stable measurement value to zero.

4. The weighing machine according to claim 1, further comprising:
   a camera configured to capture an image of the product placed on the weighing table,
   wherein the processor determines whether or not the product has been removed from the weighing table based on the image captured by the camera.

5. The weighing machine according to claim 1, further comprising:
   a camera configured to capture an image of the product placed on the weighing table,
   wherein the processor estimates a type of the product based on the image captured by the camera and calculates the price of the estimated product.

6. The weighing machine according to claim 5, wherein the processor determines whether or not a position of the product has been set on the weighing table based on a plurality of images captured by the camera and, upon determining the position of the product has been set, estimates the type of the product based on one of the images used to determine the position has been set.

7. The weighing machine according to claim 6, further comprising:

a display configured to display the images captured by the camera,
wherein the display displays the one of the images.

8. The weighing machine according to claim 7, further comprising:
a touch panel configured to receive an instruction for the processor to estimate the product again after the one of the images has been displayed on the display,
wherein the processor estimates the type of the product based on an image newly captured by the camera when the touch panel receives the instruction.

9. The weighing machine according to claim 8, wherein the processor estimates a plurality of candidates for the product, the display displays the plurality of candidates for the product, the touch panel receives an input for designating one of the products from among the plurality of candidates for the product, and the processor calculates a price of the product designated by the touch panel.

10. The weighing machine according to claim 9, wherein the processor sets an order the plurality of candidates for the product in descending order of probability of each of the plurality of candidates for the product being the product placed on the weighing table, and the display displays the plurality of candidates for the product based on the order set by the processor.

11. The weighing machine according to claim 4, further comprising:
at least one light configured to emit light to the weighing table,
wherein the camera is disposed above the weighing table, and
the light is positioned above the weighing table and is disposed such that an optical axis of the light is inclined with respect to the weighing table.

12. The weighing machine according to claim 11, wherein the at least one light includes two lights, and
the two lights are positioned so as to interpose the camera therebetween above the weighing table and are disposed such that optical axes of the light are inclined with respect to the weighing table and the optical axes cross each other.

13. The weighing machine according to claim 4, further comprising:
a light configured to emit light to the weighing table; and
a support body in which the camera, the light and the scale are disposed, wherein the light is positioned above the weighing table in the support body and is disposed such that an axis of the camera in an imaging direction is inclined with respect to the weighing table, and the light is positioned above the weighing table in the support body and is disposed such that an optical axis of the light is inclined with respect to the weighing table.

14. The weighing machine according to claim 13, wherein the camera and the light are disposed on a side of one of two areas of a placement surface of the weighing table, the two areas being defined by a first straight line passing through a center of the placement surface as viewed from a direction perpendicular to the placement surface, the camera and the light being further disposed on a second straight line perpendicular to the first straight line.

* * * * *